(12) United States Patent
Metcalfe et al.

(10) Patent No.: US 6,249,357 B1
(45) Date of Patent: Jun. 19, 2001

(54) SYSTEM AND APPARATUS FOR TONAL REPRODUCTION CURVE ADJUSTMENT IN A HYBRID ERROR DIFFUSION PROCESS

(75) Inventors: David J. Metcalfe, Marion; Jeng-Nan Shiau, Webster, both of NY (US)

(73) Assignee: Xerox Corporation, Stamford, CT (US)

( * ) Notice: Subject to any disclaimer, the term of this patent is extended or adjusted under 35 U.S.C. 154(b) by 640 days.

(21) Appl. No.: 08/655,423

(22) Filed: May 30, 1996

(51) Int. Cl.$^7$ ........................................................ H04N 1/40

(52) U.S. Cl. ........................ 358/451; 358/463; 382/298; 382/299

(58) Field of Search ........................................ 358/443, 428, 358/445, 451, 452, 463, 465, 466; 382/252, 286, 298, 299, 300

(56) References Cited

U.S. PATENT DOCUMENTS

| | | | |
|---|---|---|---|
| 4,829,587 | 5/1989 | Glazer et al. | 382/47 |
| 5,121,447 | 6/1992 | Tanioka et al. | 382/50 |
| 5,258,854 | 11/1993 | Eschbach | 358/445 |
| 5,271,070 | 12/1993 | Truong et al. | 382/50 |
| 5,274,472 | 12/1993 | Williams | 358/455 |
| 5,289,294 * | 2/1994 | Fujisawa | 358/461 |
| 5,301,037 * | 4/1994 | Kang et al. | 358/451 |
| 5,317,653 | 5/1994 | Eschbach et al. | 382/50 |
| 5,327,256 | 7/1994 | Kang et al. | 358/445 |
| 5,410,615 | 4/1995 | Mailloux | 382/47 |
| 5,418,626 * | 5/1995 | Semasa | 358/451 |
| 5,442,461 | 8/1995 | Levien | 358/456 |
| 5,528,384 | 6/1996 | Metcalfe et al. | 358/447 |
| 5,553,171 * | 9/1996 | Lin et al. | 382/299 |

OTHER PUBLICATIONS

A Survey of Electronic Techniques for Pictorial Reproduction by J.C. Stoffel and J.F. Moreland IEEE Transactions on Communications, vol. COM–29, No. 12, Dec. 1981 pp. 1898–1925.

* cited by examiner

Primary Examiner—Jerome Grant, II

(57) ABSTRACT

A high addressable hybrid error diffusion process adds an error value to an input grey image value to produce a modified input grey image value before comparing the modified input grey image value with a predetermined threshold value. A rendering value and error is generated based on the comparison. The error is equal to $n(G_L/N)*A_{eff}$, wherein n is equal to the number of subpixels turned ON, $G_L$ is the maximum grey value for a pixel, N is the addressability of the rendering system, and $A_{eff}$ is an effective spot area value for the rendering system. The effective spot area value is retrieved from a look-up table having a plurality of effective spot area values based on the input grey image value. The effective spot area values is created from a process of scanning a set of grey test patches corresponding to a set of known grey input values and generating image data therefrom, printing a set of grey patches based on the generated image data, measuring a reflectance of each grey test patch to generate a plurality of output grey values, one output grey value for each test patch and corresponding known grey input value, generating a tonal reproduction curve from the set of known grey input values and corresponding output grey values, calculating a plurality of effective spot area values, each effective spot area value being a result of dividing one output grey value by the corresponding known grey input value, and storing the plurality of effective spot area values as a function of the output grey value. The generated error is fractionalized and diffused to neighboring pixels.

28 Claims, 26 Drawing Sheets

$$\text{Actual Output} = \frac{a*255A_{eff}}{N}$$

SYSTEM AND APPARATUS FOR TONAL REPRODUCTION CURVE ADJUSTMENT IN A HYBRID ERROR DIFFUSION PROCESS

FIELD OF THE PRESENT INVENTION

The present invention is directed to an error diffusion process which allows for adjustment of the tonal reproduction curve (TRC) in a printer or printing system. More specifically, the present invention is directed to an error diffusion process for adjusting the tonal reproduction curve so as to compensate for spot overlap produced by a printing device.

BACKGROUND OF THE PRESENT INVENTION

A well known method of rendering grey images on a binary output device is error diffusion. Error diffusion is most commonly used in displaying continuous tone images on a bi-level display. However, error diffusion has been also utilized in digital copiers and binary printing devices to render grey and continuous tone images.

FIG. 31 illustrates a conventional error diffusion technique. In Step S1 of this process, the video signal for pixel X is modified to include the accumulated error diffused to this pixel from previous threshold processes. The modified video signal value X is compared at Step S2 with the value 128, assuming a video range between 0 and 255. If Step S2 determines that the modified video signal value X is greater than or equal to 128, the process proceeds to Step S4 wherein a value is output to indicate the turning ON of pixel X. The process then proceeds to calculate the error associated with the threshold process at Step S6 wherein this error, Y, is calculate as being X−255.

On the other hand, if Step S2 determines that the modified video signal value X is less than 128, a signal is output at Step S3 indicating that the pixel X is to be turned OFF. The process then proceeds to Step S5 wherein the error, Y, is calculated as being equal to the value X.

The error calculated in either Steps S5 or S6 is multiplied by weighting coefficients and distributed to downstream pixels in Step S7. Thus, the error from the threshold process is diffused to adjacent pixels. The coefficients conventionally used to diffuse the error to adjacent downstream pixels are illustrated in FIG. 32.

In FIG. 32, X represents the current pixel being thresholded. The weighted errors from this threshold process are diffused to adjacent downstream pixels according to preselected coefficients. For example, the weighting coefficient for the next pixel in the same scanline conventionally is 7/16, whereas the coefficient for the pixel that is one over in the fastscan direction and one down in the slowscan direction from the currently processed pixel is 1/16.

In describing the error diffusion process, it is assumed that the video value is in a range between 0 and 255. However, any chosen range for the video signal can be utilized. As described above, in conventional error diffusion methods, the binarization of the pixel or the reduction of its grey level is determined by comparing a modified input with a threshold. The modified input video signal is the input video signal, V, plus an accumulated error term, $e_i$, determined from the processing of previous pixels.

One problem with utilizing error diffusion in a printing environment is that the tonal reproduction curve (TRC) tends to be nonlinear. This nonlinear characteristic of the TRC presents various problems in attempting to render a grey image or continuous tone image on a binary printing device.

For example, if a grey wedge is to be reproduced on a digital copier utilizing a conventional error diffusion process, wherein the grey wedge image is printed at 300 spots per inch, the reproduced grey wedge tends to show a rapid increase in density when compared to the original grey wedge. Moreover, if a digital copier utilizing a standard conventional error diffusion method scans in a continuous tone image and reproduces a continuous tone image at 300 spots per inch, the reproduced continuous tone image tends to be too dark in comparison with the original continuous tone image. Thus, utilizing conventional error diffusion to render grey or continuous tone images on a binary device cannot render a reproduced copy having high image quality.

To address this problem with the standard error diffusion process, it has been proposed to process the image data through a compensating grey level confirmation before printing the image data with error diffusion. An example of such a proposal is disclosed in U.S. Pat No. 5,087,981. The entire contents of U.S. Pat. No. 5,087,981 are hereby incorporated by reference.

U.S. Pat. No. 5,087,981 discloses the utilization of a compensation grey level transformation wherein the area coverage of a new print spot minus that of the area coverage that corresponds to the overlap of the previously printed spots is calculated. This net spot coverage is then normalized to the pixel spacing and is square to determine the effective area A. It is noted that in this transformation, A is greater than 1. Once the effective area of the new print spot is calculated, the effective area is utilized in computing the total error for diffusing to downstream pixels. More specifically, the total error in printing a pixel with a grey level G is calculated as G−A.

If a grey wedge is scanned in by a digital copier and the grey edge image is reproduced at 300 spots per inch utilizing the compensating error diffusion process of U.S. Pat. No. 5,087,981, the reproduced grey wedge demonstrates a gradual increase in density when compared to the original grey wedge. However, the utilization of this compensating error diffusion process appears to produce clumps and streaks of dark pixels in the midtone to shadow areas of the reproduced grey edge. Therefore, it is desirable to provide a compensated error diffusion method wherein the density of a reproduced grey wedge gradually increases without the artifacts of clumps and streaks of dark pixels in the midtone to shadow areas.

SUMMARY OF THE INVENTION

One aspect of the present invention is a method of reducing a number of levels in a multi-level grey scale pixel value representing a pixel and diffusing an error generated from reducing the number of levels. The method receives the multi-level grey scale pixel value of a first resolution; generates a screened multi-level grey scale pixel value; reduces the number of levels in the screened multi-level grey scale pixel value; generates an error value as a result of the reduction process; modifies the generated error value based on an effective area value dependent on the multi-level grey scale pixel value; and diffuses the error value to multi-level grey scale pixel values of adjacent pixels.

A second aspect of the present invention is a system for reducing a number of levels in a multi-level grey scale pixel value representing a pixel and diffusing an error generated from reducing the number of levels. The system includes input means for receiving the multi-level grey scale pixel value, the multi-level grey scale pixel value having a first resolution; screening means for generating a screened multi-level grey scale pixel value; high addressability means for converting the screened multi-level grey scale pixel value to a second resolution, the second resolution being higher than the first resolution; reduction means for reducing the number of levels in the screened multi-level grey scale pixel value; spot area means for generating an effective spot area value based on the received multi-level grey scale pixel value; error means for generating a plurality of possible error values; means for multiplying each possible error value by the effective spot area value to produce a plurality of possible modified error values; selecting means for selecting an error value from the plurality of possible modified error values as a result of the reduction by said reduction means; and error diffusing means for diffusing the selected modified error value to multi-level grey scale pixel values of adjacent pixels.

A third aspect of the present invention is a method of generating an error value. The method performs the steps of generating a screened multi-level grey scale pixel value representing a pixel having a first resolution; converting the screened multi-level grey scale pixel value to a second resolution, the second resolution being higher than the first resolution; thresholding the screened multi-level grey scale pixel value representing the pixel having the second resolution; generating the error value as a result of thresholding the screened multi-level grey scale pixel value, the error value having the first resolution; generating an effective spot area value dependent on the received multi-level grey scale pixel value; and modifying the generated error value based on the generated effective spot area value.

A fourth aspect of the present invention is a printing system for rendering marks on a recording medium. The printing system includes receiving means for receiving a multi-level grey scale pixel value representing a pixel having a first resolution; screening means for generating a screened the multi-level grey scale pixel value; interpolation means for converting the screened multi-level grey scale pixel value to a second resolution, the second resolution being higher than the first resolution; binarization means for binarizing the converted multi-level grey scale pixel value so as to output a binary signal and an error value, the error value having a resolution equal to the first resolution; spot area means for generating an effective spot area value based on the received multi-level grey scale pixel value; modifying means for modifying the error value based on the generated effective spot area value; diffusing means for diffusing the modified error value to multi-level grey scale pixel values corresponding to pixels adjacent to the pixel having the first resolution; and rendering means for converting the binary signal into a mark on the recording medium.

A fifth aspect of the present invention is a system for generating an error. The system includes receiving means for receiving a multi-level grey scale pixel value representing a pixel having a first resolution; screening means for generating a screened the multi-level grey scale pixel value; interpolation means for converting the screened multi-level grey scale pixel value to a second resolution, the second resolution being higher than the first resolution; binarization means for binarizing the converted multi-level grey scale pixel value so as to output a binary signal and an error value, the error value having a resolution equal to the first resolution; spot area means for generating an effective spot area value based on the received multi-level grey scale pixel value; and modifying means for modifying the error value based on the generated effective spot area value.

A sixth aspect of the present invention is a system for reducing a number of levels in a multi-level grey scale pixel value representing a pixel and diffusing an error generated from reducing the number of levels. The system includes input means for receiving the multi-level grey scale pixel value, the multi-level grey scale pixel value having a first resolution; screening means for generating a screened multi-level grey scale pixel value; reduction means for reducing the number of levels in the screened multi-level grey scale pixel value; spot area means for generating an effective spot area value based on the received multi-level grey scale pixel value; error means for generating an error value based on the reduction by said reduction means; means for multiplying the error value by the effective spot area value to produce a plurality of a modified error value; and error diffusing means for diffusing the modified error value to multi-level grey scale pixel values of adjacent pixels.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

The following will be a detailed description of the drawings illustrating the present invention.

Figure 1:
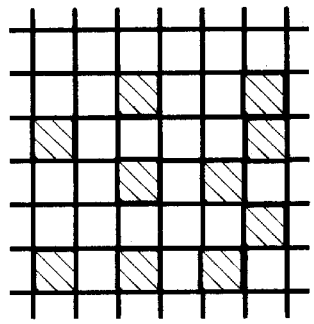
FIG. 1 shows a graphical representation of the dot pattern of an ideal printer.

Typically, an individual output "dot" area of any printer does not correlate perfectly to the resolution of the printer. More specifically, as illustrated in FIG. 1, in an "ideal" printer, the output would be rectangular to match the resolution of the input scanners photodiodes used to generate each grey scale pixel value, and thus, the "dot" areas would not cross over a pixel boundary from one "dot" to the next.

Figure 2:
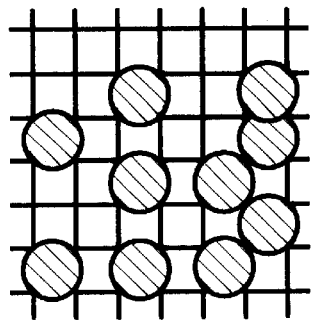
FIG. 2 shows a graphical representation of the dot pattern of a non-ideal printer.
Figure 3:
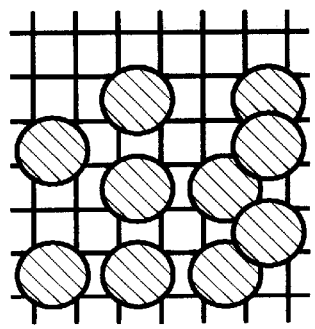
FIG. 3 shows a graphical representation of the dot pattern of another non-ideal printer.

However, as noted above, the individual output "dot" area of most printers does not correlate perfectly to the resolution of the printer. For example, laser, ink jet, and dot matrix printers render a circular spot the size and shape of which will vary from device to device. Examples of such situations are illustrated in FIGS. 2 and 3. More specifically, FIGS. 2 and 3 illustrate the typical situation depicting the physical and visual effects that spot overlap produces on the overall darkness/lightness of an array of dots rendered on a bi-level write black printer magnified within a region.

The spot overlap effect tends to accelerate the density of a white to black grey scale transition, and is especially important in the case of error diffusion and hybrid error diffusion processing since the error to be propagated and added to the downstream pixels is subtracted and generated from an ideal black pixel value. The error which should be propagated downstream is therefore somewhat larger; i.e., more towards white; than the error which would have been produced in the classical error diffusion process. This is necessary since both an individual dot and the overall appearance of a cluster of dots on a hardcopy output will be darker than expected.

An example of a hybrid error diffusion process which encounters the spot overlap situation will be described briefly.

A hybrid error diffusion process is a process which has combined screening with error diffusion. In such a process, an unmodified video or image signal is screened by a modulator to produce a modified signal $V_S'$ using a preferred equation of $V_S'=(G_L-V_i)+(S_i-Th)$, wherein $S_i$ is equal to screen values derived from a halftone screen pattern, $V_i$ is the grey input video, $G_L$ is a maximum grey level value for a pixel in the system, and Th is the threshold value used in the binarization process.

This modified signal $V_S'$ is fed into an adder where the signal is further modified by the addition of an error value propagated from upstream processed pixel locations to produce $V_S''$ ($V_S''=V_S'+e_i$). The error component ($e_{FIFO}+e_{FB}$) utilized by the adder is received from an error buffer ($e_{FIFO}$) which stores the propagated error and a binarization circuit ($e_{FB}$).

The further modified signal $V_S''$ is fed into the binarization circuit which converts the multi-level modified signal $V_S''$ to a binary output by utilizing an error diffusion/threshold process. Some of the error ($e_{FB}$) from this process is fed back directly to the next to be processed pixel, while the rest ($e_{FIFO}$) is stored in the error buffer for processing of pixels in the next scanine. The apportionment of the error is based on weighting coefficients. Any set of coefficients can be used. In the preferred embodiment of the present invention, the weighting coefficients are the coefficients described in U.S. Pat. No. 5,353,127. The entire contents of U.S. Pat. No. 5,353,127 are hereby incorporated by reference.

In this binarization process, the error that is produced represents the difference between the desired output, the multi-level image data value, and the actual output value which is either 255 or 0 if the multi-level of the image data is represented by 8 bits. This error is diffused, thereby retaining as much grey level information as possible.

The hybrid error diffusion process can also be a high addressability hybrid error diffusion process; therefore, the screening/high addressability error diffusion process will be explained in more detail below.

To extend the conventional error diffusion process, described above, to a high addressability environment, the binarization (threshold) is performed at a higher spatial resolution, but the error computation and propagation is performed at the original lower spatial resolution. This splitting of the process substantially prevents or reduces the number of isolated subpixels, thereby maintaining high image quality. This high resolution/low resolution method of the present invention will be explained in more detail below.

In explaining the high addressability hybrid error diffusion process, it is assumed that the input grey levels at pixel location i and pixel location i+1 are represented by $V_i$ and $V_{i+1}$, respectively, wherein $V_i'=(G_L-V_i)+(S_i-Th)$, and $V_{i+1}'=(G_L-V_{i+1})+(S_{i+1}-Th)$. The rendering error, at the lower resolution, that passes from upstream pixels to the downstream pixel location is denoted by $e_i$.

It is noted that a feature of high addressability involves interpolation between pixels, the creation of subpixels. This interpolation impacts the high addressability error diffusion process. More specifically, depending on the way the interpolation is done, two distinct outputs can be obtained utilizing the high addressability error diffusion process of the present invention. Each one of these distinct outputs will be discussed below.

With respect to a first interpolation scheme, the steps for determining the printing or rendering of a subpixel are as follows.

Initially, the modified pixel values $P0_i=V_i+e_i$ and $P1_i=V_{i+1}+e_i$ are computed wherein $V_i'=(G_L-V_i)+(S_i-Th)$, and $V_{i+1}'=(G_L-V_{i+1})+(S_{i+1}-Th)$. The subpixels are denoted by 0 to N−1 wherein the high addressability characteristic is N. The high addressability characteristics is the number of subpixels that a printer can produce compared to the throughput bandwidth of the image processing system. In other words, the high addressability characteristic defined as the number of subpixels that the image output terminal can render from one pixel of image data.

High addressability is important in situations where the device can process the image data at one resolution, but print at a higher resolution. In such a situation, the present invention can take advantage of a processing system designed for a lower resolution image, (lower resolution can be processed quicker and less expensively), and a printing device which, through laser pulse manipulation, can print at a higher resolution. For example, the image can be processed at 600×600×8 and printed at 2400×600×1 using the high 10 addressability process of the present invention. In the above example, the high addressability characteristic is 4. If the image was processed at 600×600×8 and printed at 1200×600×1, the high addressability characteristic would be 2.

The interpolated subpixel values are computed as $B_n=P0+n(P1-P0)/N$ for n=0 to N−1. The interpolated subpixel values are then compared with a threshold value which in most cases is 128, assuming that the video value ranges from 0 to 255 ($G_L$ is equal to 255). If $B_n$ is greater than or equal to 128, the subpixel is turned ON; otherwise, the subpixel is turned OFF. The error to be propagated to downstream pixels is computed as the desired output, (P0+P1)/2, minus the actual output, namely, y*255/N, wherein y is the number of subpixels turned ON. The error is then multiplied by a set of weighting coefficients and distributed to the downstream pixels as in the first version.

More specifically, the screened inputted modified video signal is divided into N subpixel units. The P0 and P1 values are computed as noted above. The computed subpixel values are compared with a threshold value, namely 128. If the subpixel value is greater than or equal to the threshold value, the subpixel value is set to the ON state. However, if the subpixel value is less than 128, the subpixel value is set to the OFF state.

Upon completing the comparison of all subpixel values, the number of ON subpixels are calculated. Moreover, the error from the threshold process is calculated so that the value represents the original lower spatial resolution. Upon calculating the error, the error is multiplied by weighting coefficients and distributed the error to downstream pixels.

Figure 33:
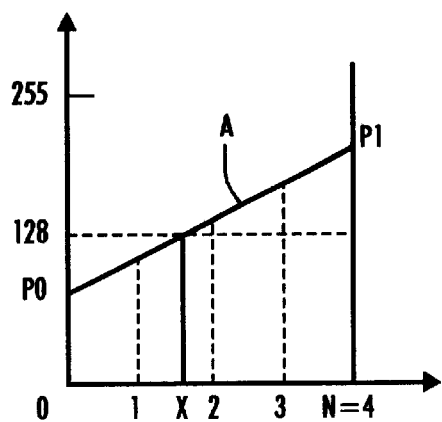
FIG. 33 shows a graph illustrating subpixel interpolation.

As noted above, the modified pixel values $P0_i=V_{i+1}+e_{i-1}=P1_{i-1}$ and $P1_i=V_i+e_i$ are computed at two locations corresponding to the input resolution wherein $V_i=(G_L-V_i)+(S_i-Th)$ and $V_{i-1}=(G_L-V_{i-1})+(S_{i-1}-Th)$. An example of this is illustrated in FIG. 33 wherein the subpixels are denoted by 0 to N−1. In FIG. 33, the high addressability characteristic, N, is equal to 4.

As illustrated in FIG. 33, a line is drawn to connect the values P0 and P1. (The i subscripts have been dropped for simplicity.) Moreover, a dotted line is drawn to represent a threshold value of 128. (Again, it is noted that 0 to 255 is the range of the video signal; however, any range can be utilized and any threshold value may be used.) The intersection of the line connecting P0 and P1 and the line representing the threshold at 128 determines which subpixels are to be rendered or printed. The X coordinate of the point of intersection is determined and normalized to N by the equation X=N (128−P0)/(P1−P0). Next, it is determined which subpixels are to be turned ON. If X is less than or equal to 0 and if P1 is greater than or equal to 128, all the subpixels are ON; otherwise, all the subpixels are OFF. This decision represents the complete rendering or non-rendering of the pixel. To determine a partial rendering of the whole pixel, a subpixel analysis must be performed. In this instance, the value X must be compared to the individual subpixel values.

It is noted, as illustrated in FIG. 33, that the value of X does not necessarily compute to a whole number or subpixel, thereby making any analysis include a fractional component. To avoid this, X is converted to a whole number or subpixel value. For this conversion, n is allowed to be equal to the truncated integer value of X. The values n and X can then be utilized to determine which subpixels are to be turned ON and which subpixels are to be turned OFF. More specifically, if X is greater than 0, but less than n, and if P1 is less than 128, only the subpixels from 0 to n are turned ON and the rest of the subpixels are turned OFF; otherwise, the subpixels from 0 to n are turned OFF and the rest are turned ON. If X is greater than or equal to n and if P0 is greater than or equal to 128, all subpixels are turned ON; otherwise, all subpixels are turned OFF.

This threshold process produces an error which needs to be propagated to downstream pixels. Moreover, as noted above, the error needs to be at the original low resolution input. The conversion to the original resolution is realized by determining the difference between the desired output, (P0+P1)/2, and the actual output, namely b*255/N, where b is the number of subpixels that were turned ON. The converted error is then multiplied by a set of weighting coefficients and distributed to the downstream pixels.

Figure 35:
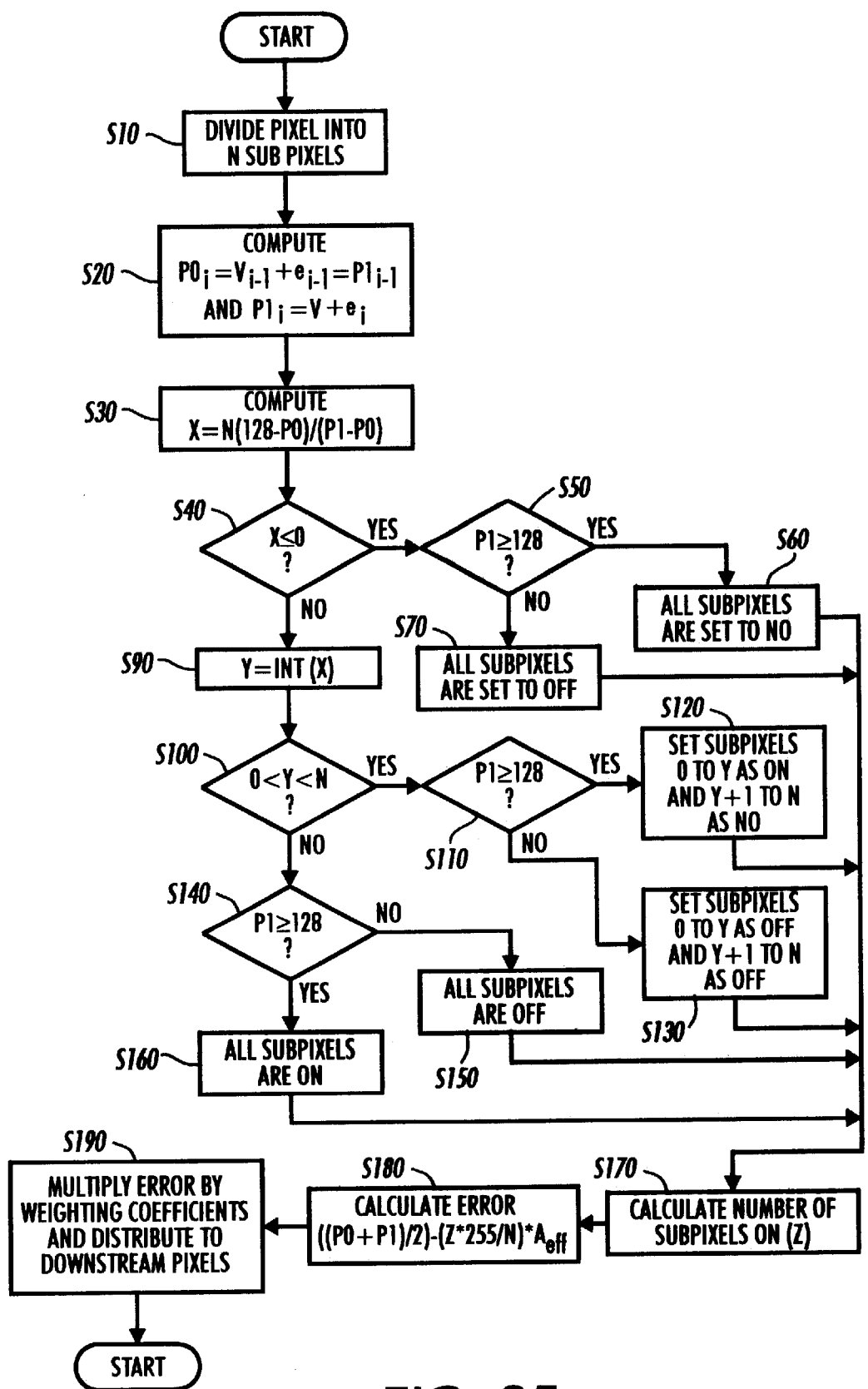
FIG. 35 shows a graph illustrating another subpixel interpolation method.

FIG. 35 illustrates the actual method utilized to carry out the interpolation and error distribution process described above. In FIG. 35, at Step S10, the modified screened video input signal is divided into N subpixel values. At Step S20, the values P0$_i$ and P1$_i$ are calculated as described above. Next, at Step S30, the X-coordinate of the point of intersection is determined and normalized by multiplying the difference between 128 and P0 by the value N and dividing this product by the difference of P1 and P0. At Step S40, the normalized value X is compared with the value 0. If X is less than or equal to 0, Step S50 compares the value P1 with the value 128. If the value P1 is greater than or equal to 128, all the subpixels are set to an ON state at Step S60. However, if P1 is less than 128, Step S70 sets all the subpixels to an OFF state.

On the other hand, if Step S40 determines that X is not less than or equal to 0, Step S90 determines the integer value of X and sets this integer value equal to Y. At Step S100, the integer value Y is compared with the values 0 and N. If the value Y lies between 0 and N, Step S10 determines whether the value P1 is less than or equal to 128. If the value P1 is less than or equal to 128, Step S120 sets the subpixels 0 to Y to the ON state and the subpixels Y+1 to N to the OFF state. However, if Step S110 determines that the value P1 is greater than 128, Step S130 sets the subpixels 0 to Y to the OFF state and the subpixels Y+1 to N to the ON state.

If Step S100 determines that the value Y is not between the values 0 and N, Steps S140 determines whether the value P1 is greater than or equal to 128. If the value P1 is greater than or equal to 128, Step S160 sets all subpixels to the ON state. However, if Step S140 determines that the value P1 is less Man 128, Step S150 sets all the subpixels to the OFF state.

Upon completing the processes at either Steps S60, S70, S120, S130, S150, or S160, the error diffusion method of the present invention proceeds to Step S170. At Step S170, the number of ON subpixels is calculated and set equal to Z. Next, at Step S180, the error to be propagated to the downstream pixels is calculated. Namely, the error is calculated to represent the original low spatial resolution. Upon calculating the error in Step S180, Step S190 multiplies the error by weighting coefficients and distributes the weighted error terms to downstream pixels.

The second interpolation method with respect to implementing the high addressability error diffusion method of the present invention will be describe as follows.

Figure 34:
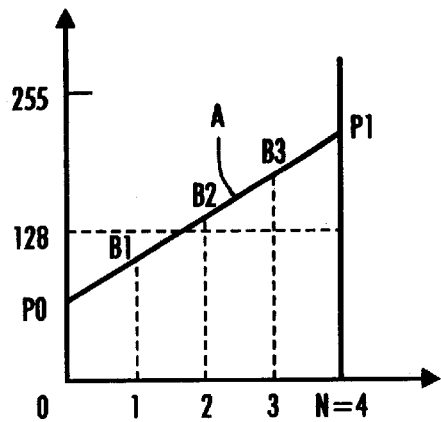
FIG. 34 shows a flowchart illustrating an error diffusion method using the interpolation schemes of FIG. 33.

As with the first interpolation method, the modified pixel values P0$_i$=V$_i$+e$_i$ and P1$_i$=V$_{i+1}$+e$_i$ are computed wherein V$_i$=(G$_L$−V$_i$)+(S$_i$−Th) and V$_{i-1}$=(G$_L$−V$_{i-1}$)+(S$_{i-1}$−Th). FIG. 34 illustrates the values P0 and P1 for the second version of the high addressability error diffusion method of the present invention.

Figure 36:
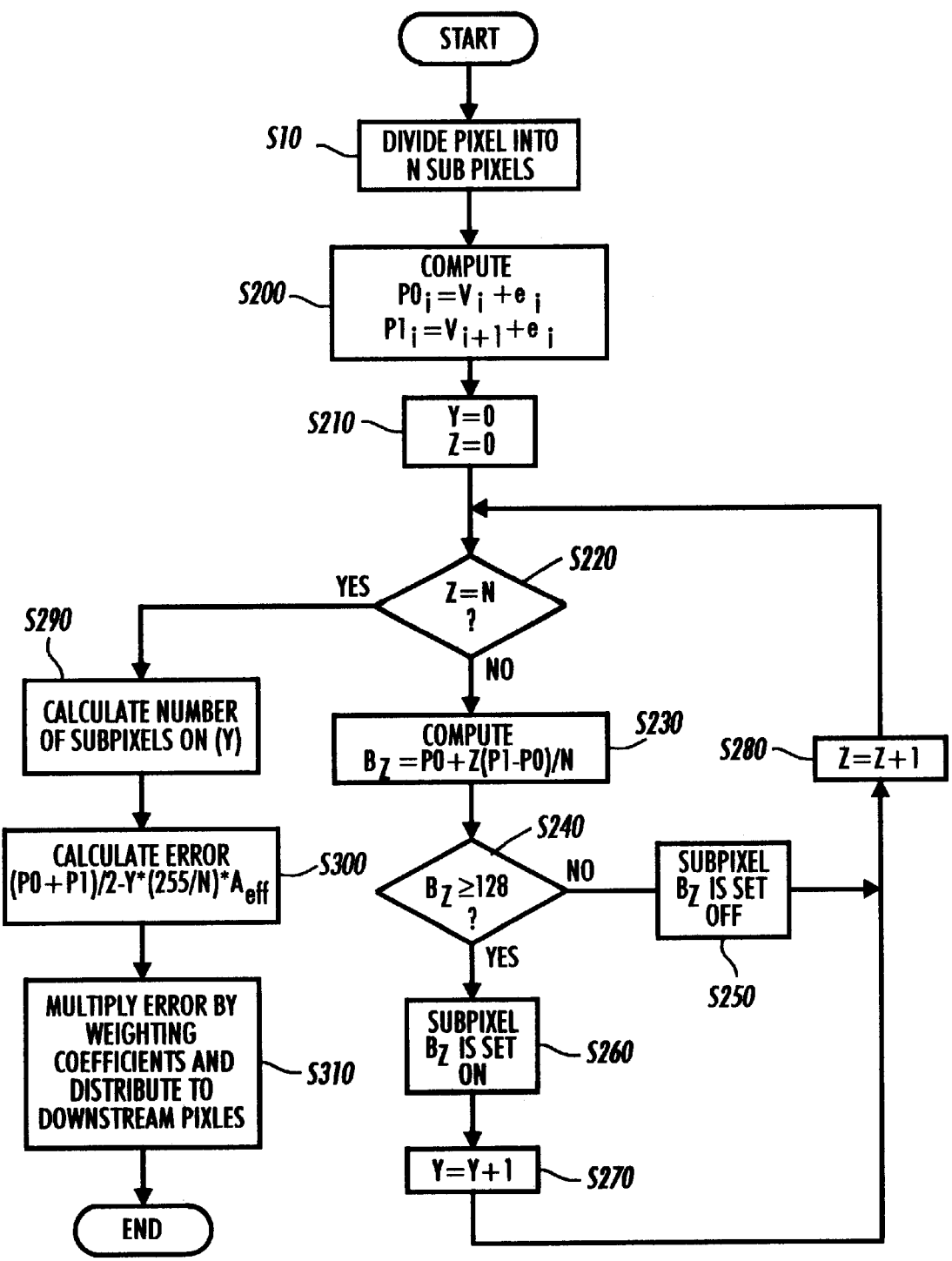
FIG. 36 shows a flowchart illustrating an error diffusion method using the interpolation scheme of FIG. 35.

FIG. 36 illustrates the process utilized in the second interpolation version of the high addressability error diffusion method of the present invention. As in the FIG. 35, the input modified video signal is divided into N subpixel units at Step S10. At Step S200, the P0 and P1 values are computed as noted above. At Step S210, the values Y and Z are set equal 0, wherein Y denotes the number of subpixels which are to be turned ON and Z denotes the addressability factor. At Step S220, Z is compared with N to determined whether all the subpixels within the modified video signal have been thresholded. If it is determined that subpixels remain to be thresholded, the process moves to Step S230 wherein the next subpixel value is computed. Step S240 then compares the computed subpixel value with the threshold value, namely 128. If the subpixel value is greater than or equal to the threshold value, Step S260 sets the subpixel value to the ON state, and Step S270 increments the value Y indicating the number of subpixels that are set ON.

However, if the subpixel value is less than 128, Step S250 sets the subpixel value to OFF.

Upon the completion of either Step S250 or Step 270, the process proceeds to Step S280 wherein the high addressability value Z is incremented. This subroutine is repeated until all subpixel values within the modified video signal are compared with the threshold value. Upon completing the comparison of all subpixel values, the process advances to Step S290 wherein the number of ON subpixels are calculated. At Step S300, the error from the threshold process is calculated so that the value represents the original lower spatial resolution. Upon calculating the error, Step S310 multiplies the error by weighting coefficients and distributes the error to downstream pixels.

Figure 37:
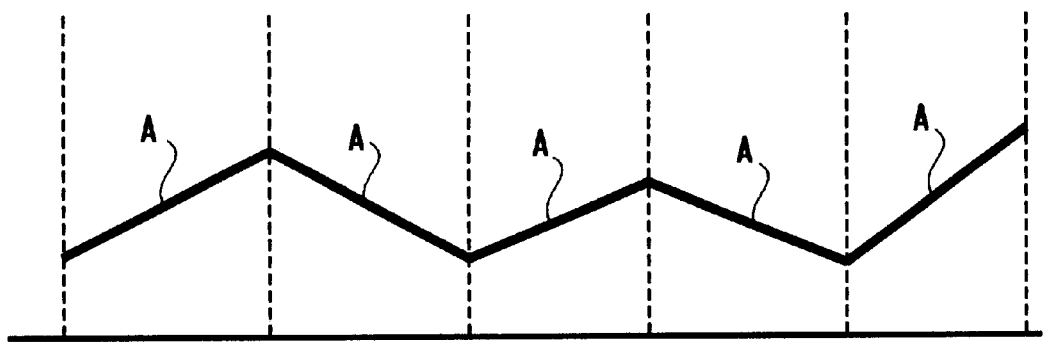
FIGS. 37 and 38 show graphs illustrating the subpixel relationships for the interpolation schemes of FIGS. 33 and 35.

FIG. 37 illustrates the high addressability relationship between adjacent pixels utilizing the first interpolation version of high addressability error diffusion method. More specifically, it is noted that the P1 value of the present pixel is utilized as the P0 value for the next pixel.

Figure 38:
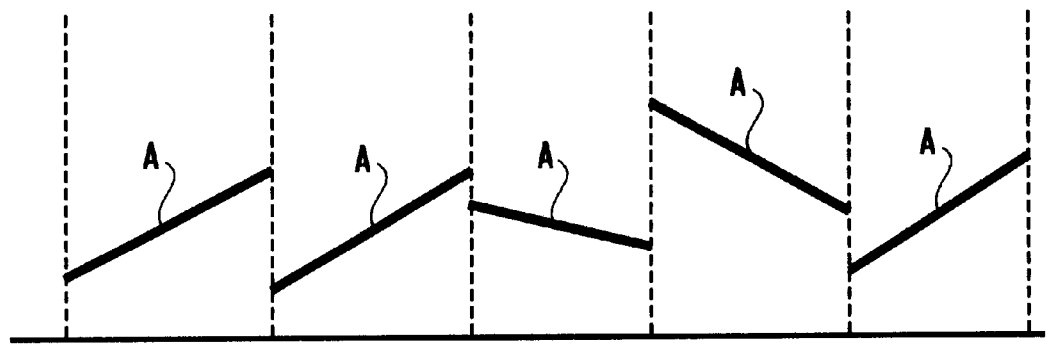

On the other hand, FIG. 38 illustrates the high addressability relationship between pixels utilizing the second interpolation version of the high addressability error diffusion method. In this case, there is discontinuity between the P1 value of the previous pixel and the P0 value of the present pixel. Thus, from these two Figures, it can be seen that the error output from the two versions of the high addressability error diffusion methods will be different.

An example of the actual architecture of the circuitry used to implement the high addressability error diffusion process will be discussed below.

Figure 10:
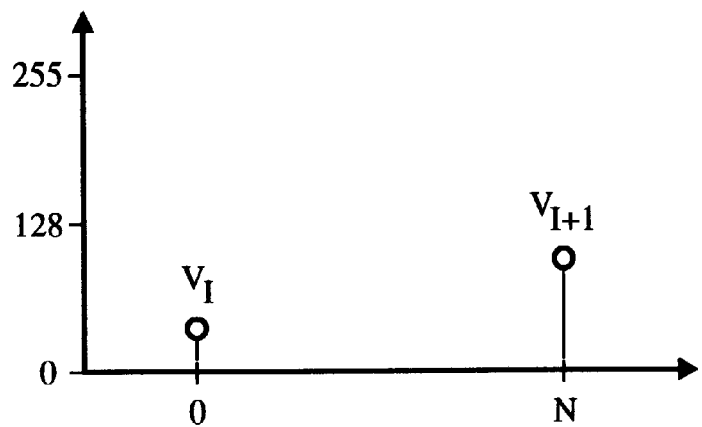
FIG. 10 shows a graphical representation of obtaining boundary subpixel values.
Figure 11:
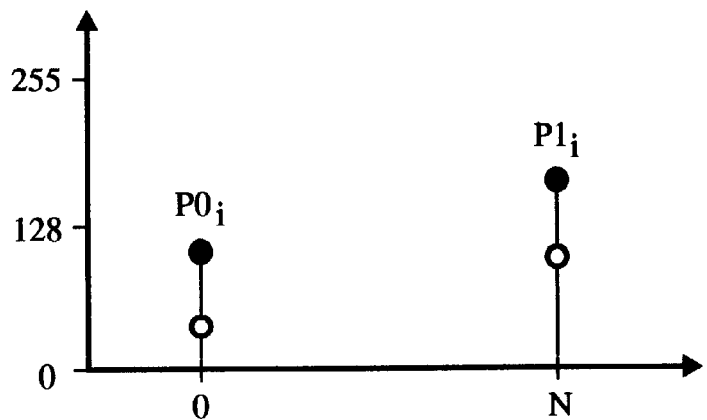
FIG. 11 shows a graphical representation of modifying the obtained boundary subpixel values with an error component.

FIGS. 10–16 illustrate the computational steps required to perform high addressability error diffusion using a particular interpolation scheme. Initially, as illustrated in FIG. 10, the pixel value V$_i$ and V$_{i+1}$ are obtained wherein V$_i$=(G$_L$−V$_i$)+(S$_i$−Th) and V$_{i-1}$=(G$_L$−V$_{i-1}$)+(S$_{i-1}$−Th). The actual pixel values are graphically illustrated in FIG. 10, wherein the pixel value V$_i$ represents the pixel value at the subpixel position 0 and the pixel value V$_{i+1}$ represents the pixel value at the N−1 subpixel. In FIG. 10, the pixel values range from 0 to 255 utilizing a conventional eight-bit dataword to represent the multi-level grey value of the image data to be process. It is noted that any range can be utilized to represent the grey level value of the image data; for example, 0 to 511, 0 to 127, etc.

After obtaining the initial pixel values of V$_i$ and V$_{i-1}$, a diffused error component e$_i$ (the accumulated error from previous pixel binarization processes) is added to the pixel values V$_i$ and V$_{i-1}$. It is noted that the error component e$_i$ consists of two components, e$_{FIFO}$ and e$_{FB}$, where e$_{FIFO}$ is the summed error component stored in a line buffer and e$_{FB}$ is the feedback error component. The adding of the error component e$_i$ is illustrated graphically in FIG. 11.

Figure 12:
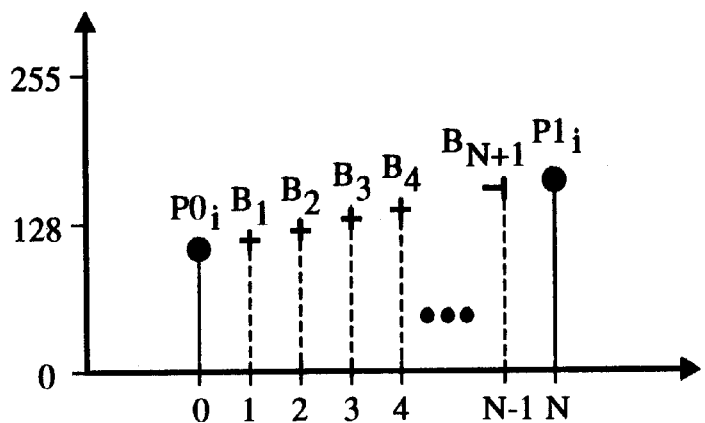
FIG. 12 shows a graphical representation of interpolating subpixel values between the modified boundary subpixel values.
Figure 13:
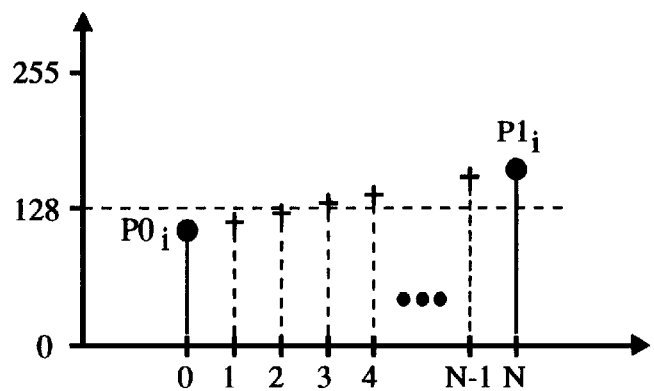
FIG. 13 shows a graphical representation of comparing the interpolated subpixel values with a threshold value.
Figure 14:
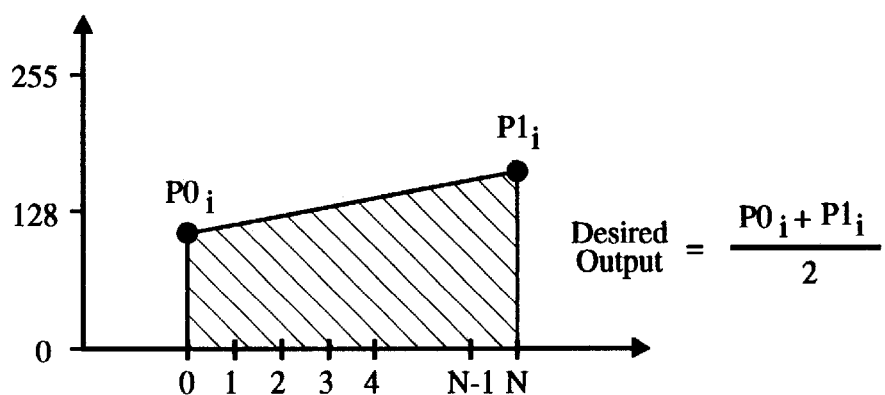
FIG. 14 shows a graphical representation of computing a desired output value.

After adding the diffused error component, the interpolated subpixel values are computed, as illustrated in FIG. 12. For example, the interpolated subpixel values are B$_n$=P0$_i$+n (P1$_i$−P0$_i$)/N for n=0 to N−1, where N is the selected high addressability characteristic. It is noted that the value P0$_i$ is equal to V$_i$+e$_i$ and P1$_i$ is equal to V$_{i+1}$+e$_i$.

After computing the interpolated subpixel values, each interpolated subpixel value is compared to a threshold level. In the example illustrated in FIG. 13, the threshold value is 128. It is noted that this threshold value can be any value within the range of the image data depending upon the desired results. In this example, each subpixel which has a value greater than or equal to 128 is set ON.

Figure 15:
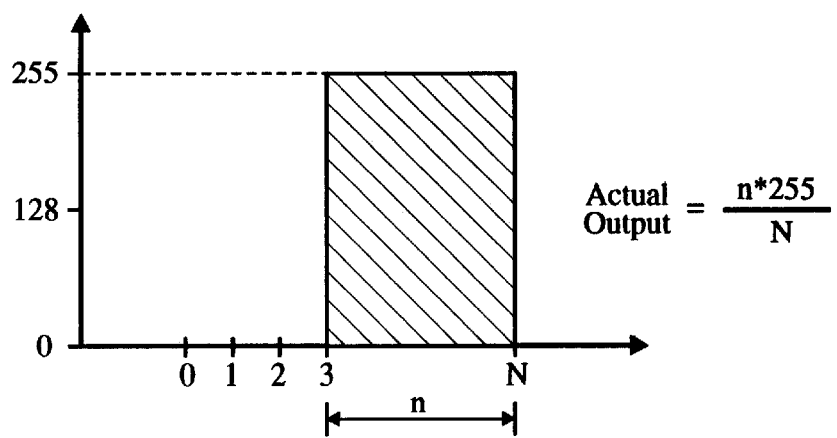
FIG. 15 shows a graphical representation of computing an actual output value.

Next, the desired output (P0$_i$+P1$_i$)/2 is computed. This computing of the desired output is graphically illustrated in FIG. 14. After computing the desired output, the actual output is computed. In this example, the actual output is equal to $(n*255/N)*A_{eff}$ where n is the number of subpixels that have been turned ON as the result of the comparison illustrated in FIG. 19 and $A_{eff}$ is the effective area spot-overlap gain as a function of input gray level. A graphical representation of the computed actual output is shown in FIG. 15.

Once the desired output and the actual output have been computed, the error diffusion method computes the error to be propagated downstream. This error is computed as the desired output minus the actual output. A graphical representation of this computation is shown in FIG. 16.

Figure 16:
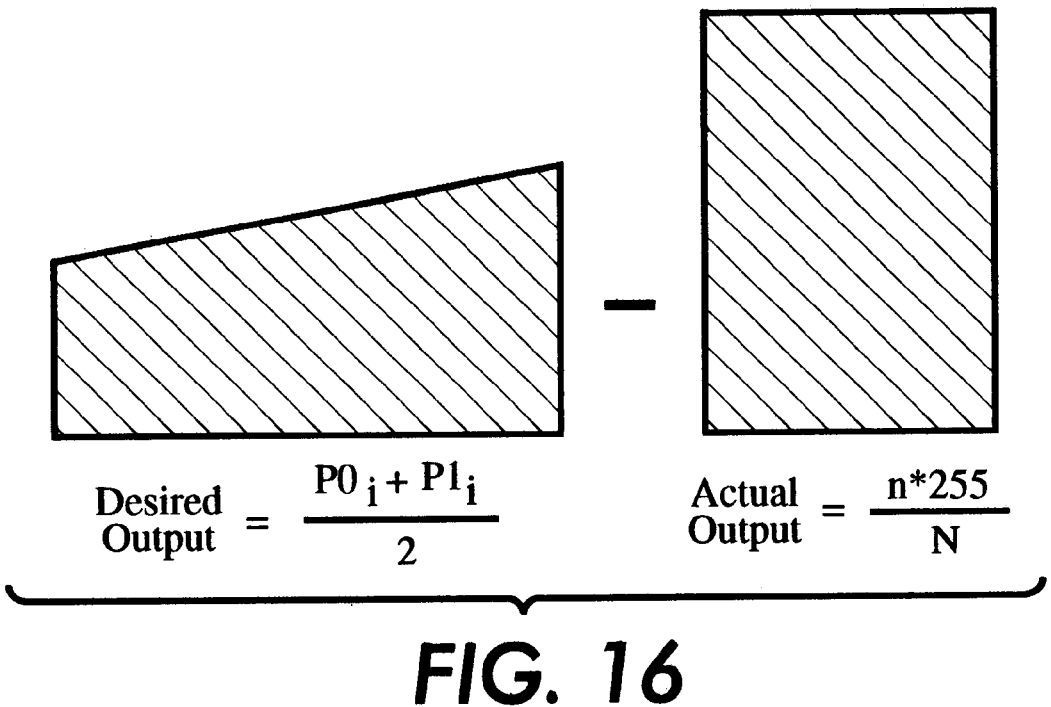
FIG. 16 shows a graphical representation of computing an error value to be propagated to downstream pixels.
Figure 17:
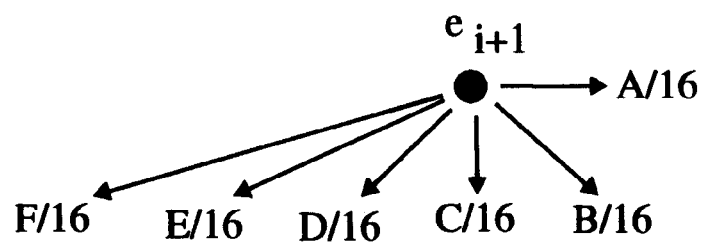
FIG. 17 shows a graphical representation illustrating actual distribution of the error in a typical error distribution routine.

As illustrated in FIG. 16, the error is calculated to be $e_{i+1}=(P0_i+P1_i)/2-(n*255/N)*A_{eff}$. In this instance, the error $e_{i+1}$ represents the error from the present binarization process. As in all conventional error diffusion processes, the error from the binarization process is distributed to downstream pixels. The distributing of the error $e_{i+1}$ to downstream pixels is illustrated in FIG. 17. In this example, the distribution of error utilizes a set of error diffusion coefficients which allow fast processing by simple bit shifting. FIG. 17 illustrates the coefficients associated with each pixel location.

Figure 18:
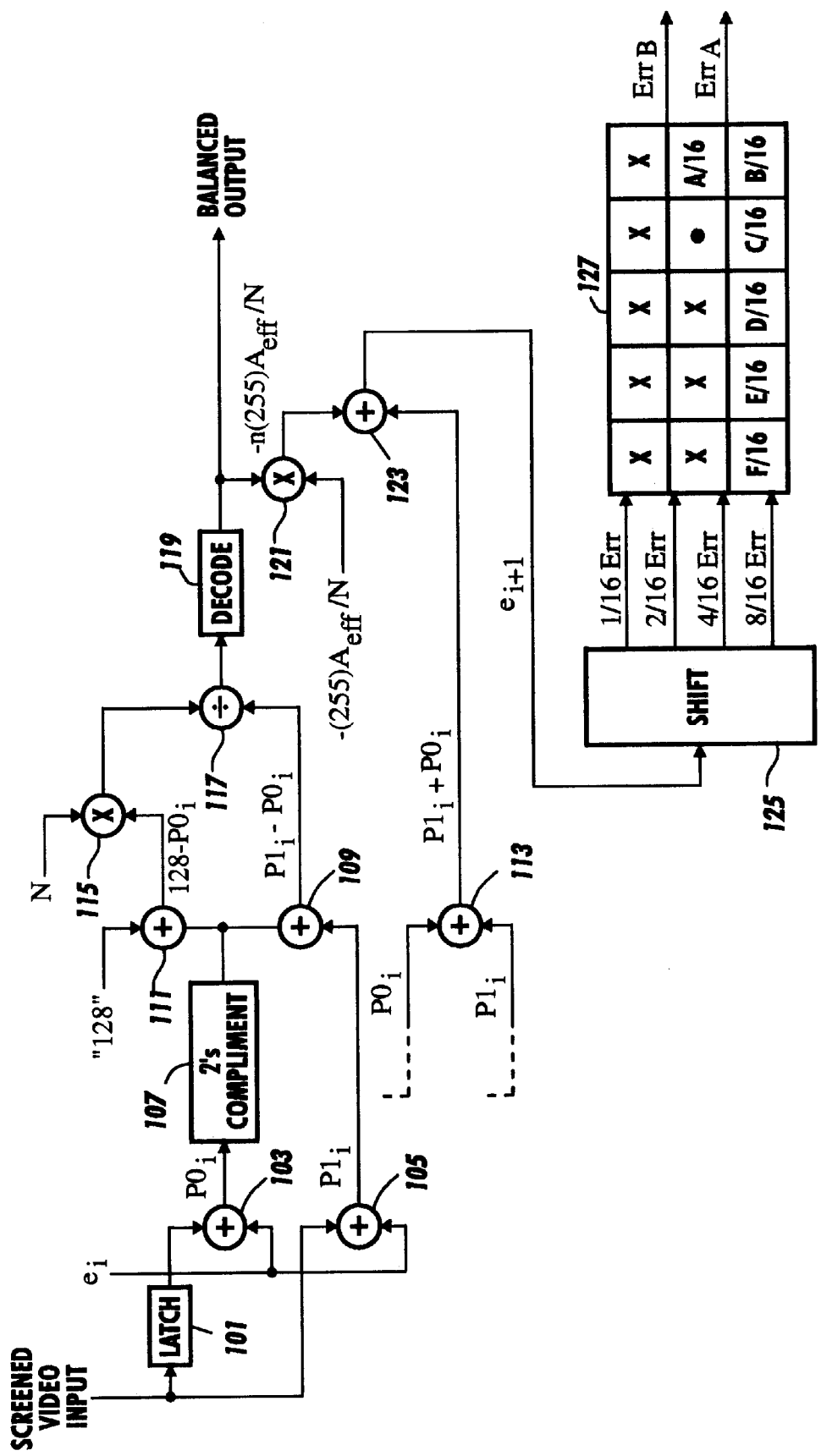
FIG. 18 shows a block diagram illustrating one embodiment of the present invention implementing a high addressability error diffusion process.

In FIG. 18, the screened input video signal is split and latched in latch 101 so as to produce the screened pixel values $V0_i$ and $V1_i$. $V0_i$ represents the latched screened input video signal $V1_i$ as noted above, and $V0_i$ represents the screened pixel value just proceeding the screened pixel value $V1_i$ in the same scanline. The screened pixel value $V0_i$ is fed into an adder 103 with the error component $e_i$. Moreover, the error component $e_i$ is fed into an adder 105 along with the screened input video signal $V1_i$. The adder 103 produces an output signal $P0_i$ which is fed into a 2's compliment circuit 107 to produce negative $P0_i$. Negative $P0_i$ is fed into an adder 109 along with the value $P1_i$ to produce the value of $P1_i-P0_i$. Negative $P0_i$ is also fed into adder 111 which is summed with the threshold value. In this example, the threshold value is 128.

The sum from adder 111 is fed into multiplier 115 so that the value $(128-P0_i)$ can be multiplied by the high addressability characteristic value N. The resulting product is then divided by the sum from adder 109 by a divider circuit 117. The resulting quotient is fed into a decoder 119. The actual function of decoder 119 is graphically illustrated in FIG. 19.

Figure 19:
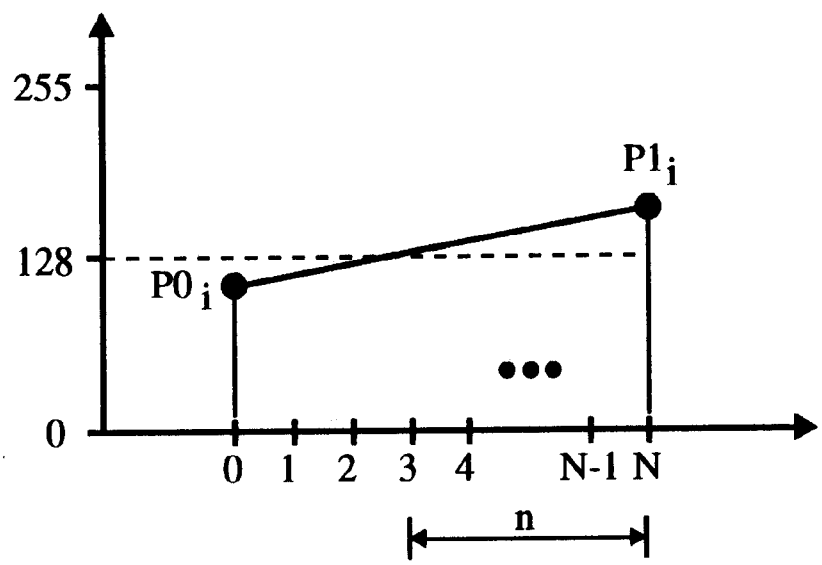
FIG. 19 shows a graphical representation illustrating a decoding process illustrated in FIG. 18.

More specifically, the decoder 119, as illustrated in FIG. 19, determines the intersection of the $P0_i/P1_i$ line and the value 128. From the determination of this intersection, the decoder 119 determines the number of subpixels n which are turned ON. The results from decoder 119 are fed as binarized output to a print engine and also to a multiplier 121. Multiplier 121 multiplies the output from decoder 119 with the value $(-255/N)*A_{eff}$. The product of multiplier 121 is added to a sum generated by an adder 113 in adder 123. Adder 113 adds the values $P0_i$ and $P1_i$ to produce the value $P1_i+P0_i$.

The results of adder 123 represents the error component $e_{i+1}$ which is fed into a simple bit shifting circuit 125 to produce various error values that will be utilized in the distribution process. The error values generated by the bit shifting circuit 125 are fed into an error distribution circuit 127, wherein half the error $Err_B$ is distributed to the next pixel in the same scanline and the other half of the error $Err_A$ is distributed to various pixels in the next scanline according to the weighting coefficients established in the error distribution circuit 127.

Figure 20:
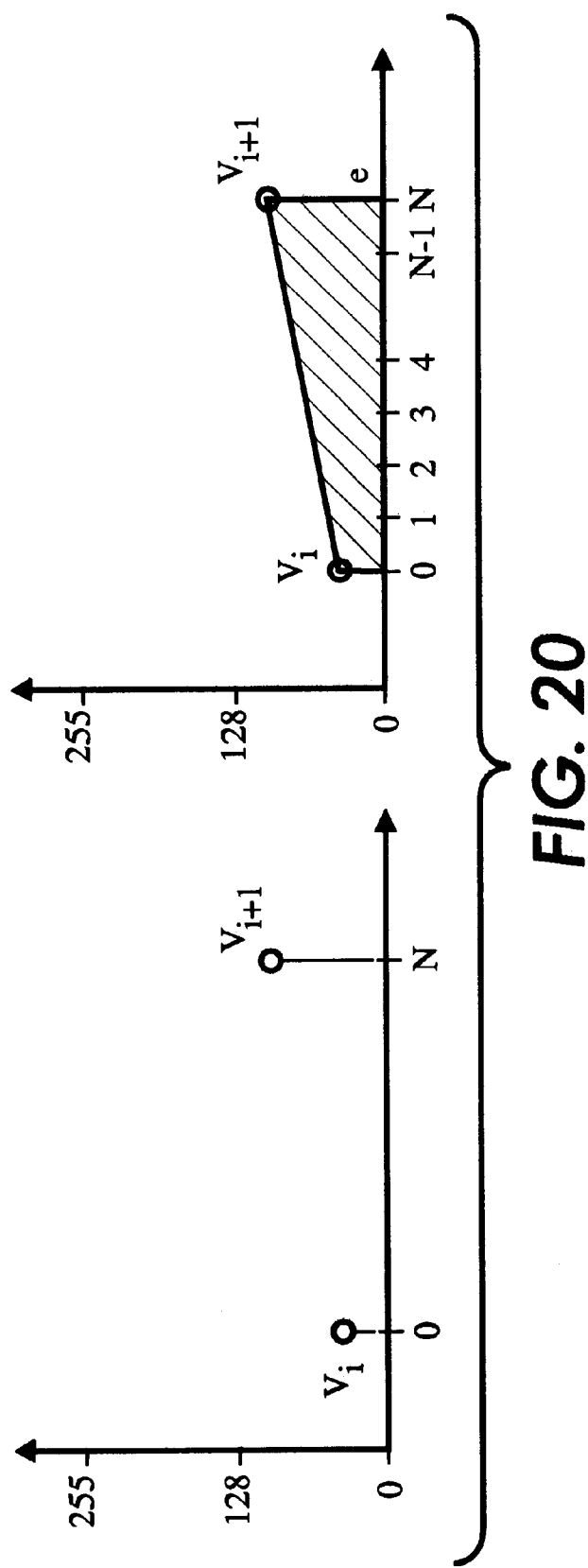
FIG. 20 shows a graphical representation illustrating the obtaining boundary subpixel values in parallel with the computing a desired output value.

FIG. 20 illustrates two parallel computations which are carried out in the present invention. More specifically, FIG. 20 illustrates that the screened pixel values $V_i$ and $V_{i+1}$ are obtained in parallel to the beginning of the computation of the desired output for a single subpixel wherein the desired output is computed without including the diffused error components $e_{FIFO}$ or $e_{FB}$.

Figure 21:
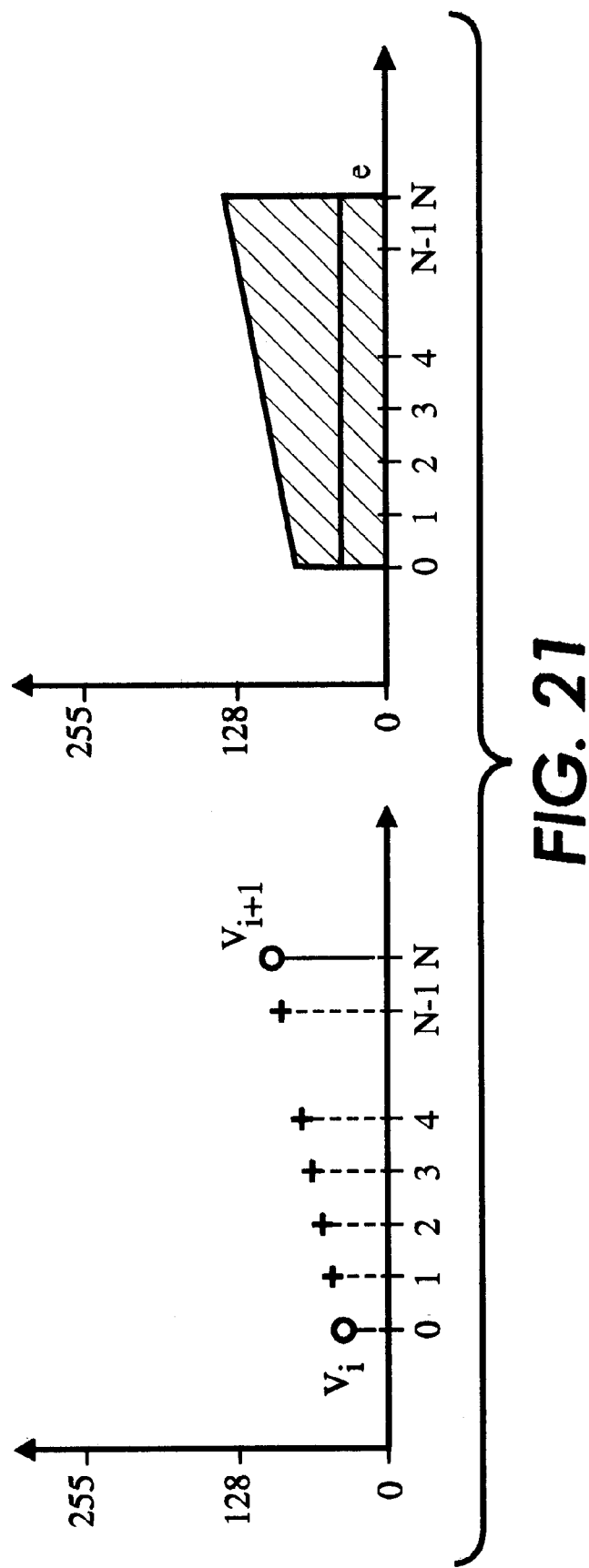
FIG. 21 shows a graphical representation illustrating the interpolating of subpixel values between the obtained boundary subpixel values in parallel with the modifying of the desired output value with an error component.

After these parallel computations are completed, the preferred embodiment of the present invention computes interpolated subpixel values in the same way as illustrated in FIG. 12. However, in parallel with this computation of the interpolated subpixel values, the desired output is continued to be computed by adding the error component $e_{FIFO}$. This is graphically represented in FIG. 21.

Figure 22:
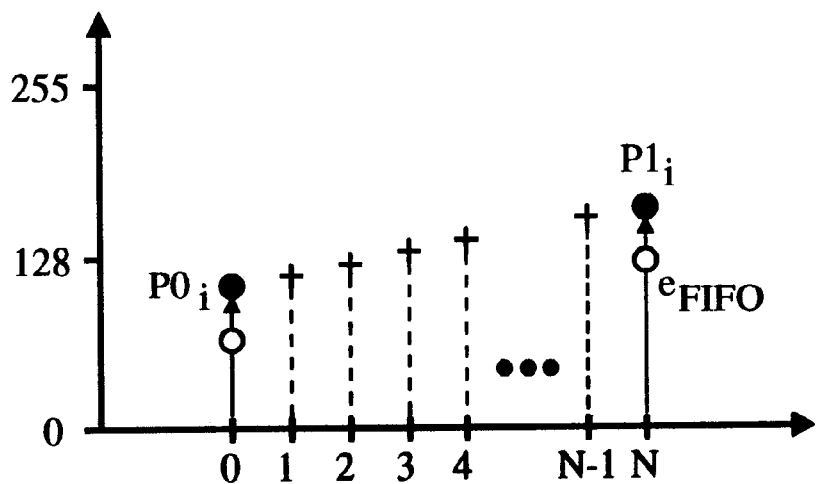
FIG. 22 shows a graphical representation illustrating the modifying of the subpixel values between the obtained boundary subpixel values with an error component.
Figure 23:
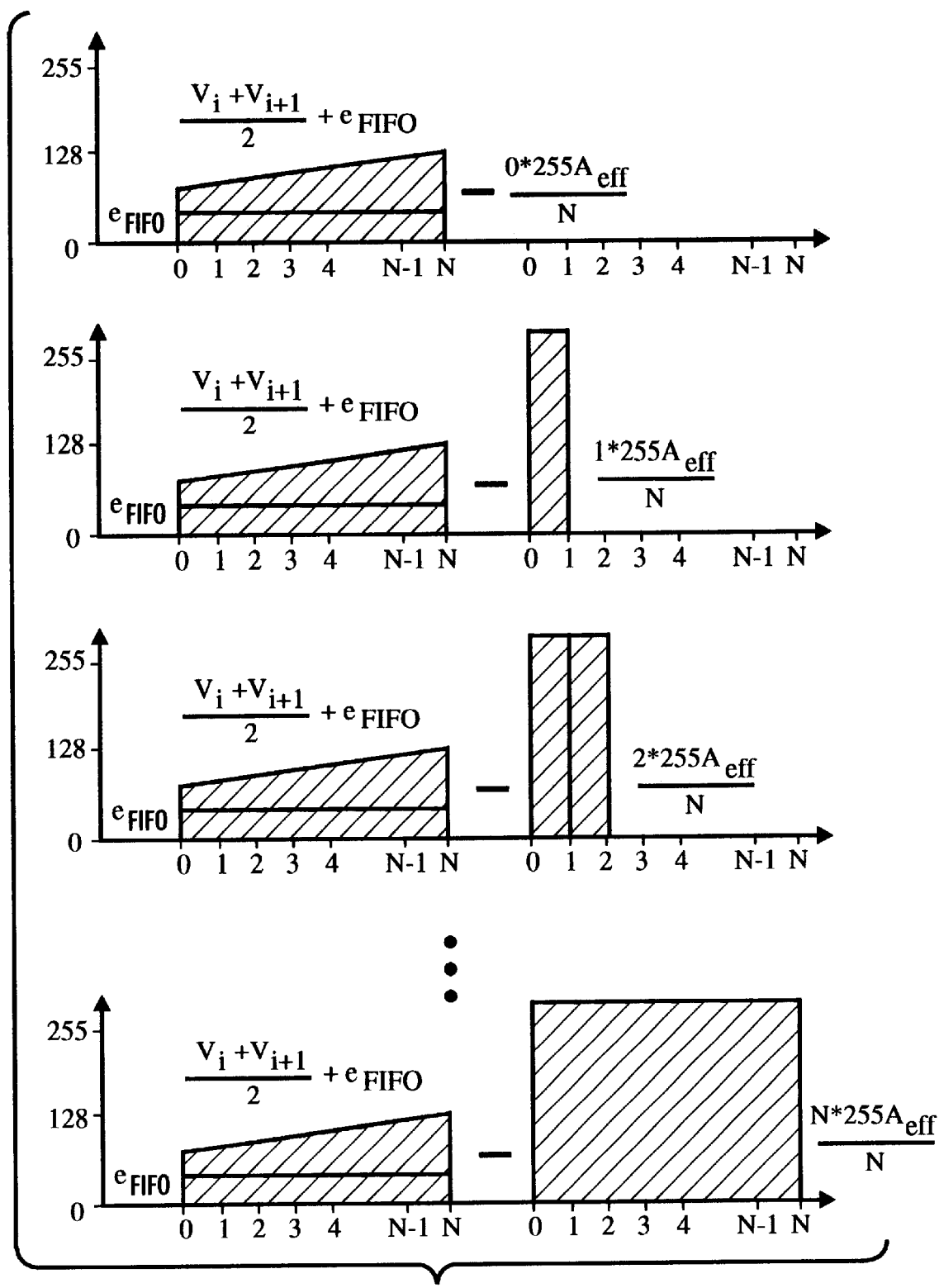
FIG. 23 shows a graphical representation illustrating the calculation of a plurality of partial possible error values.

Next, the error component $e_{FIFO}$ is added to the screened pixel values $V_i$, and $V_{i+1}$ and the interpolated subpixels as illustrated in FIG. 22. At the same time (in parallel thereto), all possible actual subpixel outputs are subtracted from the desired output without including the diffused error component $e_{FB}$. In other words, N possible actual subpixel outputs are subtracted from the desired output computed in FIG. 21 to produce N possible error outputs $e_p$ (the desired output minus the actual output is equal to the error $e_p$). The computations illustrated in FIG. 22 are carried out in parallel with the computations illustrated in FIG. 23.

Figure 24:
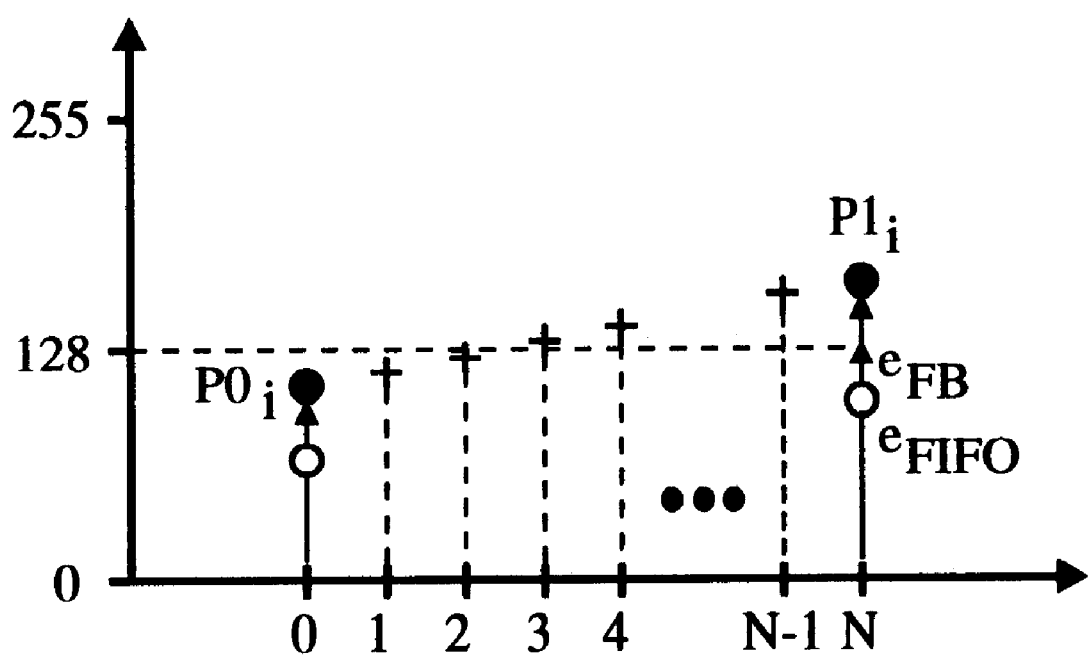
FIG. 24 shows a graphical representation of further modifying the modified subpixel values of FIG. 20 with another error component.
Figure 25:
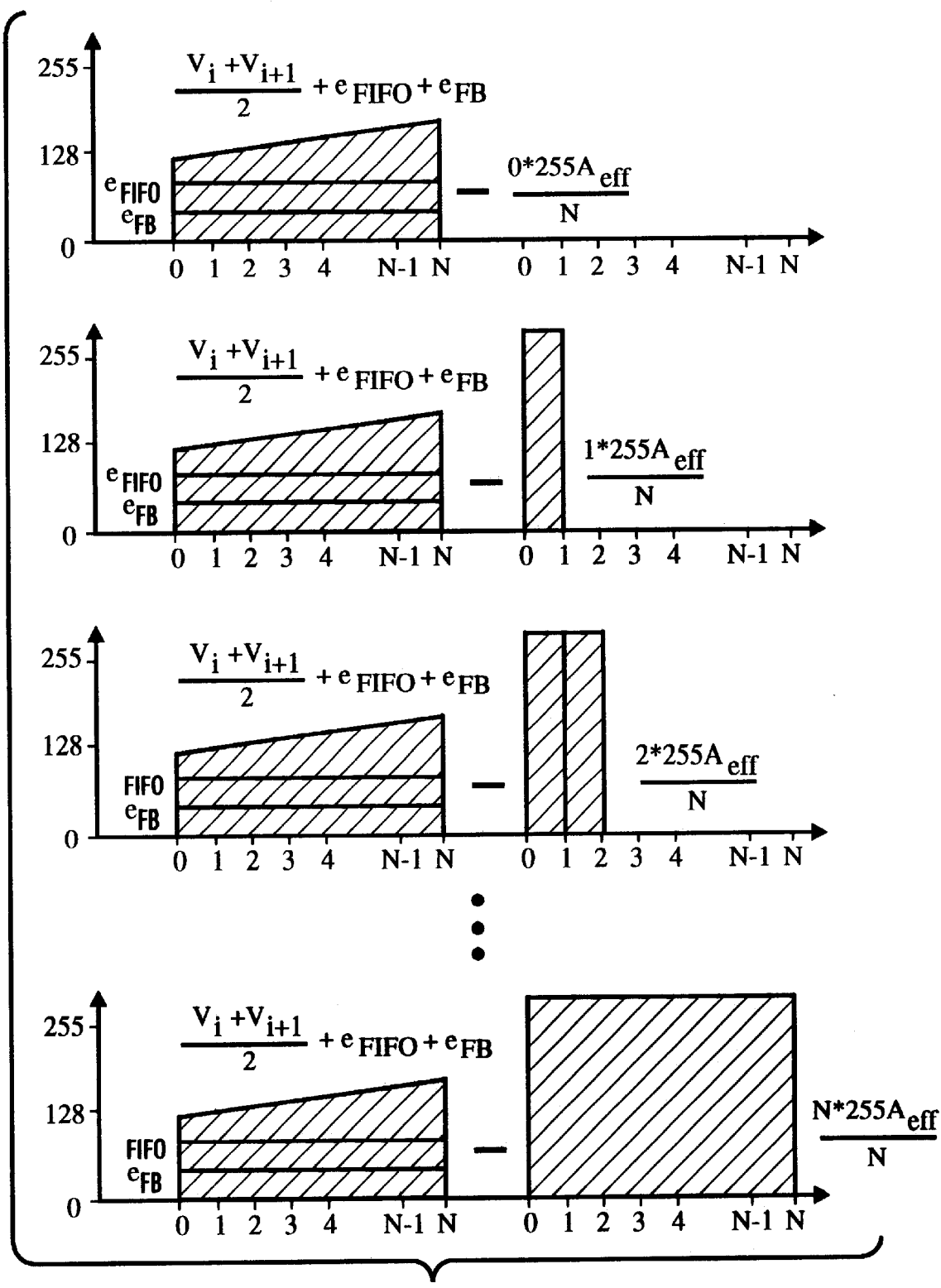
FIG. 25 shows a graphical representation illustrating the calculation of a plurality of complete possible error values.

The error component $e_{FB}$ is added to the screened pixel values $V_i$, $V_{i+1}$, and the various interpolated subpixel values as illustrated in FIG. 24. At the same time that the feedback error component $e_{FB}$ is being added in FIG. 24, the error component $e_{FB}$ is added to all possible subpixel desired outputs as illustrated in FIG. 25. In other words, the error component $e_{FB}$ is individually added to all N error results $(e_p)$ stemming from the calculations illustrated by FIG. 23.

Figure 26:
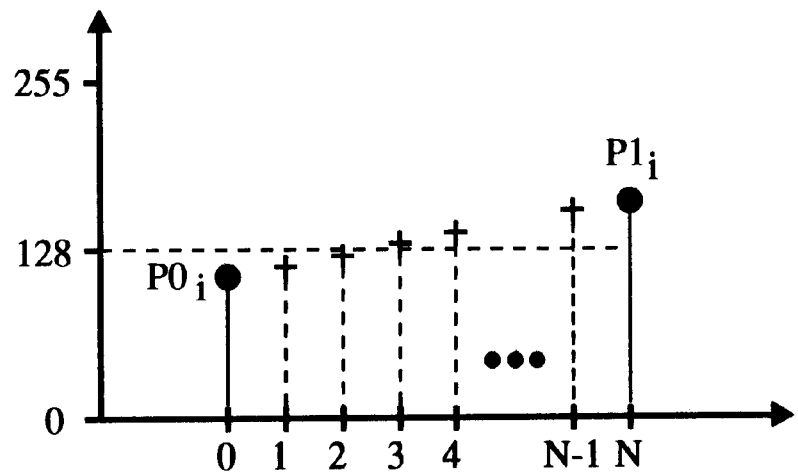
FIG. 26 shows a graphical representation of thresholding the further modified subpixel values.
Figure 27:
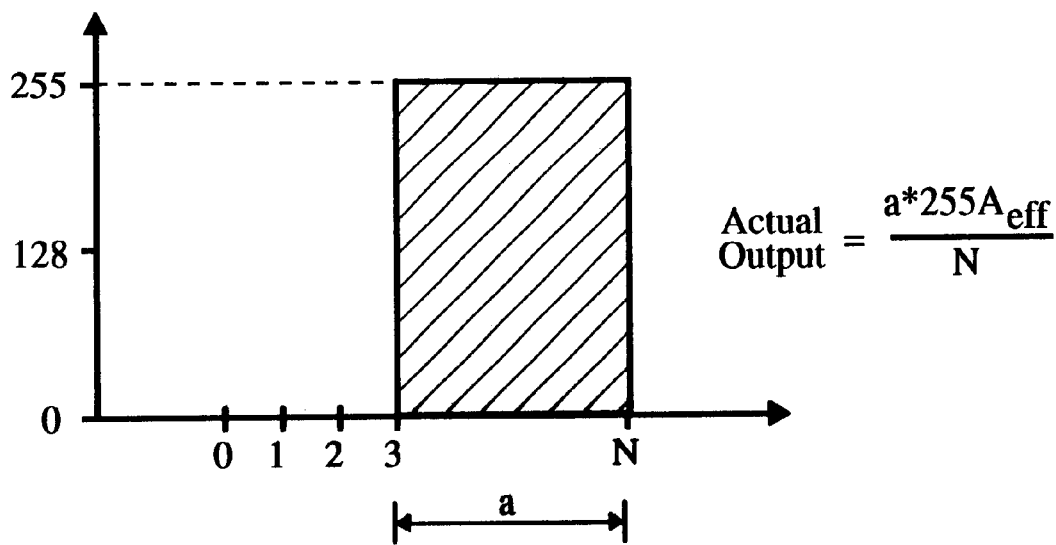
FIG. 27 shows a graphical representation of determine of number of subpixels exceeding or equal to a threshold value.
Figure 28:
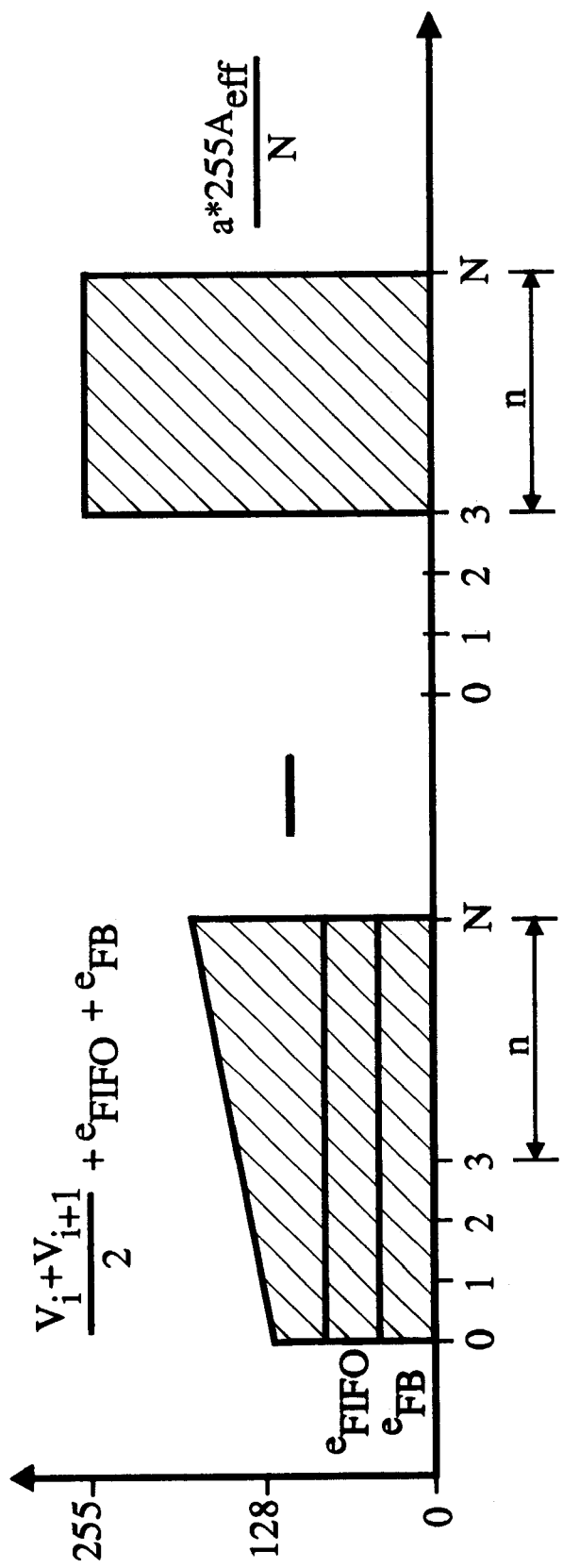
FIG. 28 shows a graphical representation of selecting one of the plurality of possible complete error values.

After completing these parallel computations, the next step includes the computations illustrated in FIGS. 26, 27, and 28. In this next step, each interpolated subpixel value is compared to a threshold value of 128, and the subpixels having a value greater than or equal to the threshold value are turned ON. This process is graphically illustrated in FIGS. 26 and 27 wherein FIG. 26 shows the comparison of the interpolated subpixel values with the threshold values, and FIG. 27 shows the turning ON of the subpixels which have a value greater than or equal to the threshold value.

Since all the possible error values were made simultaneously available as a result of the computations illustrated in FIG. 25, the error to be propagated downstream can now be immediately selected; i.e., via a multiplexer, based upon the number of subpixels which are turned ON. In other words, FIG. 28 illustrates the properly selected error value from the various simultaneously available error values produced by the computations illustrated in FIG. 25. The selected error value is then distributed to downstream pixels utilizing any conventional error diffusion technique. In the preferred embodiment of the present invention, the error is distributed to downstream pixels utilizing the error diffusion coefficients discussed above.

Although the utilization of a high addressability hybrid error diffusion process has many benefits, as noted above with respect to conventional error diffusion, the spot overlap effect is also prevalent in the high addressability hybrid error diffusion process. The spot overlap effect tends to accelerate the density of a white to black grey scale transition, and is especially important in the case of error diffusion and hybrid error diffusion processing since the error to be propagated added to the downstream pixels is subtracted and generated from an ideal black pixel value.

Figure 8:
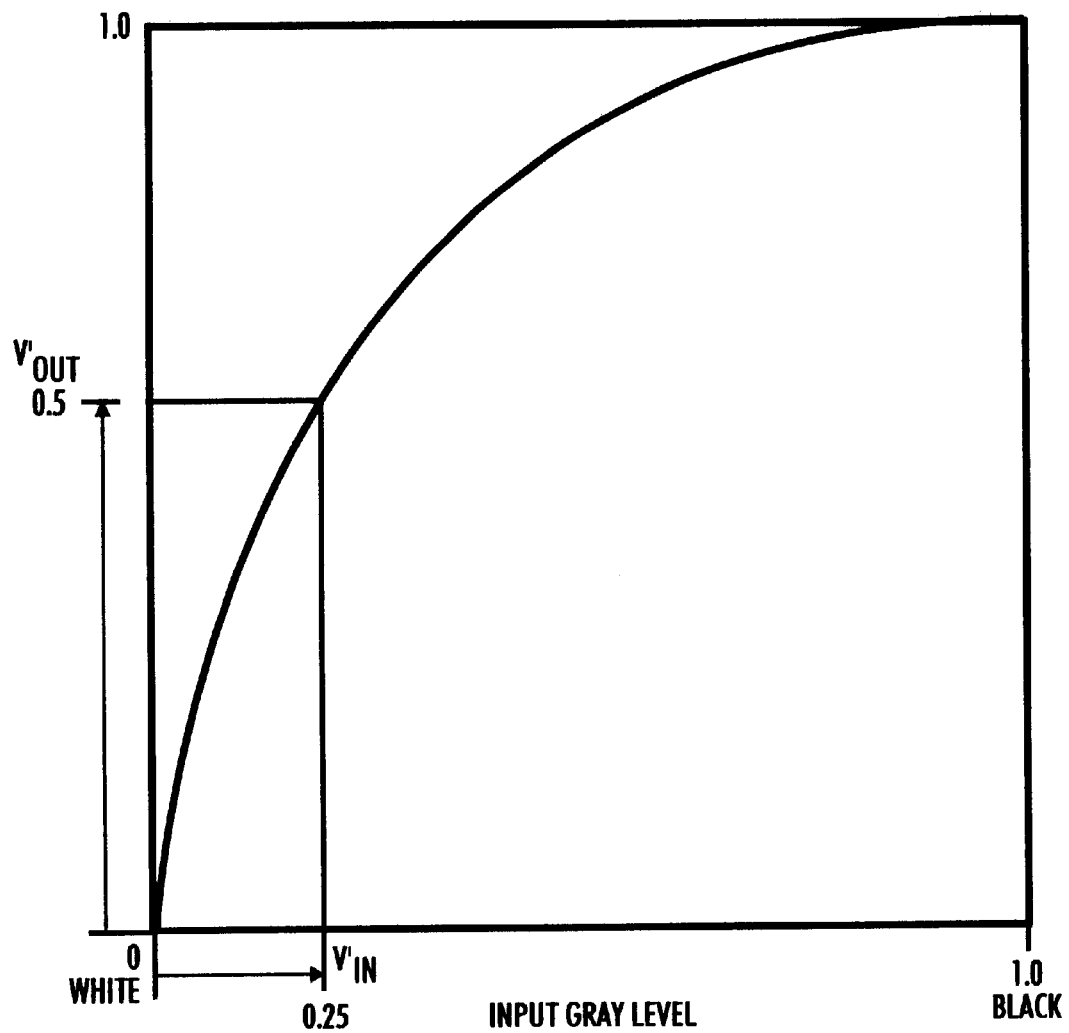
FIG. 8 shows a tonal reproduction curve illustrating the general shape of the input and output grey level relationship for a convention binary printing device utilizing a standard error diffusion process.

One possible solution to correcting for this spot overlap a high addressability hybrid error diffusion environment is to utilize a tonal reproduction curve adjustment method. However, when utilizing a tonal reproduction curve adjustment in a high addressability hybrid error diffusion process, the tone reproduction is generally non-linear. An example of this non-linearity is illustrated in FIGS. 4 and 8.

Figure 4:
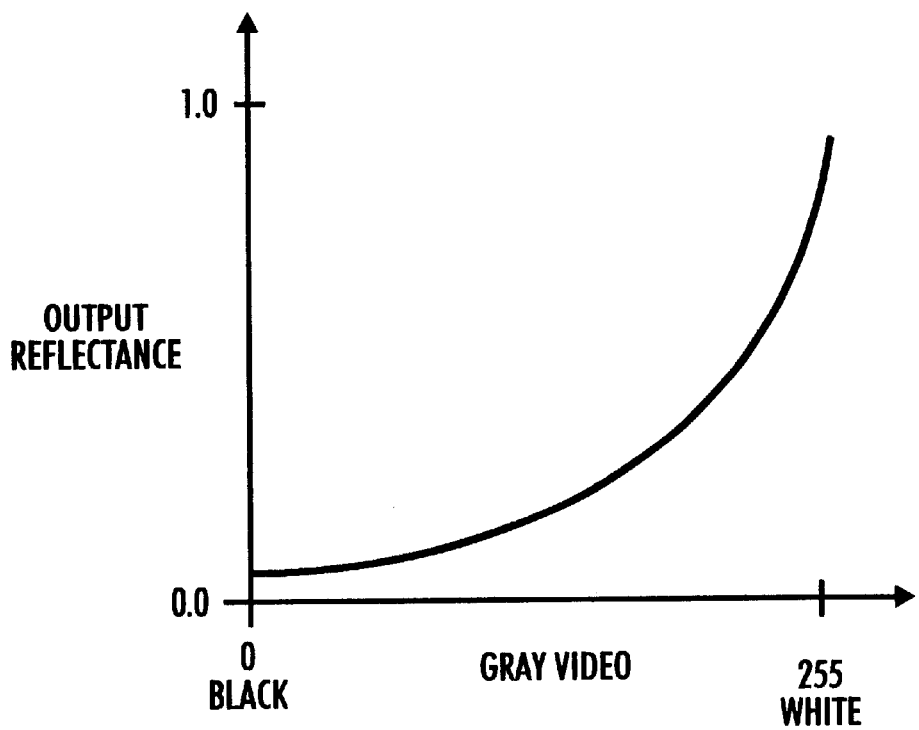
FIG. 4 shows a tonal reproduction curve illustrating the general shape of the input and output grey level relationship for a convention binary printing device utilizing a standard error diffusion process.

As illustrated in FIG. 4, the relationship between the input grey video value and the output reflectance is non-linear as the input grey video value increases in value from black to white. On the other hand, as illustrated in FIG. 8, the relationship between the input grey video value and the output reflectance also is non-linear as the input grey video value increases in value from white to black. Since the tone reproduction is non-linear, it is necessary to linearize the tone reproduction in order to utilize such a method in a high addressability hybrid error diffusion process.

In the ideal case, where the printed spot is a rectangular grid with no spot overlap, the value that should be stored for each address location is $-(255/N)$ where N is a number of high addressable bits that represents a high addressability characteristic of the printer. In the preferred embodiment of the present invention, N is a value from 1 to 4. However, as noted above, printers are not ideal and thus spot overlap occurs. Therefore, where the printed spot overlaps the rectangular pixel grid by some finite amount, the value that should be stored for each address location is $-(255/N)*A_{eff}$ where $A_{eff}$ is the input dependent effective spot area coverage ranging between 1.0 and $K_{max}$ where $K_{max}$ is the maximum spot-overlap gain number used in order to compensate for a wide range of printers (in the preferred embodiment $K_{max}$ is 8) and N is the number of high addressable bits.

Figure 5:
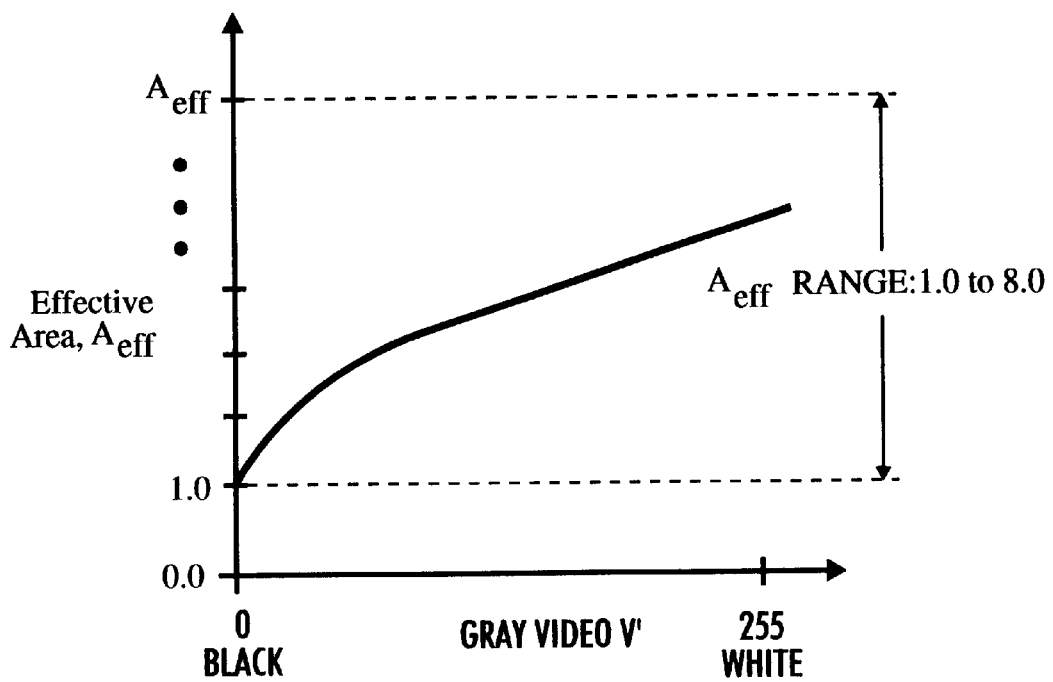
FIG. 5 shows a typical spot-overlap compensation curve used to linearize the tone reproduction of an image rendered via a standard error diffusion process and printed on a non-ideal printer.

A typical spot area compensation transfer curve which has been linearized is illustrated in FIG. 5. The effective area at the black end is normalized in reference to 1.0 since any additional spot overlap at this point does not significantly affect the reflectance value; i.e., in a xerographic printing device, the more toner particles deposited on top of toner particles does not make the image darker. The effective spot area gradually increases when moving towards the white end since the spot overlap effect will tend to have a greater impact on the images reflectance value (since there will be more isolated spots) and thus more compensation is needed to force a linear reflectance profile. As mentioned above, the profile of the spot overlap compensation curve will depend on the print characteristics of the image output terminal or printing device. A programmable spot overlap lookup table therefore enables the necessary flexibility required for tone reproduction correction for future printers with various output print characteristics.

Figure 6:
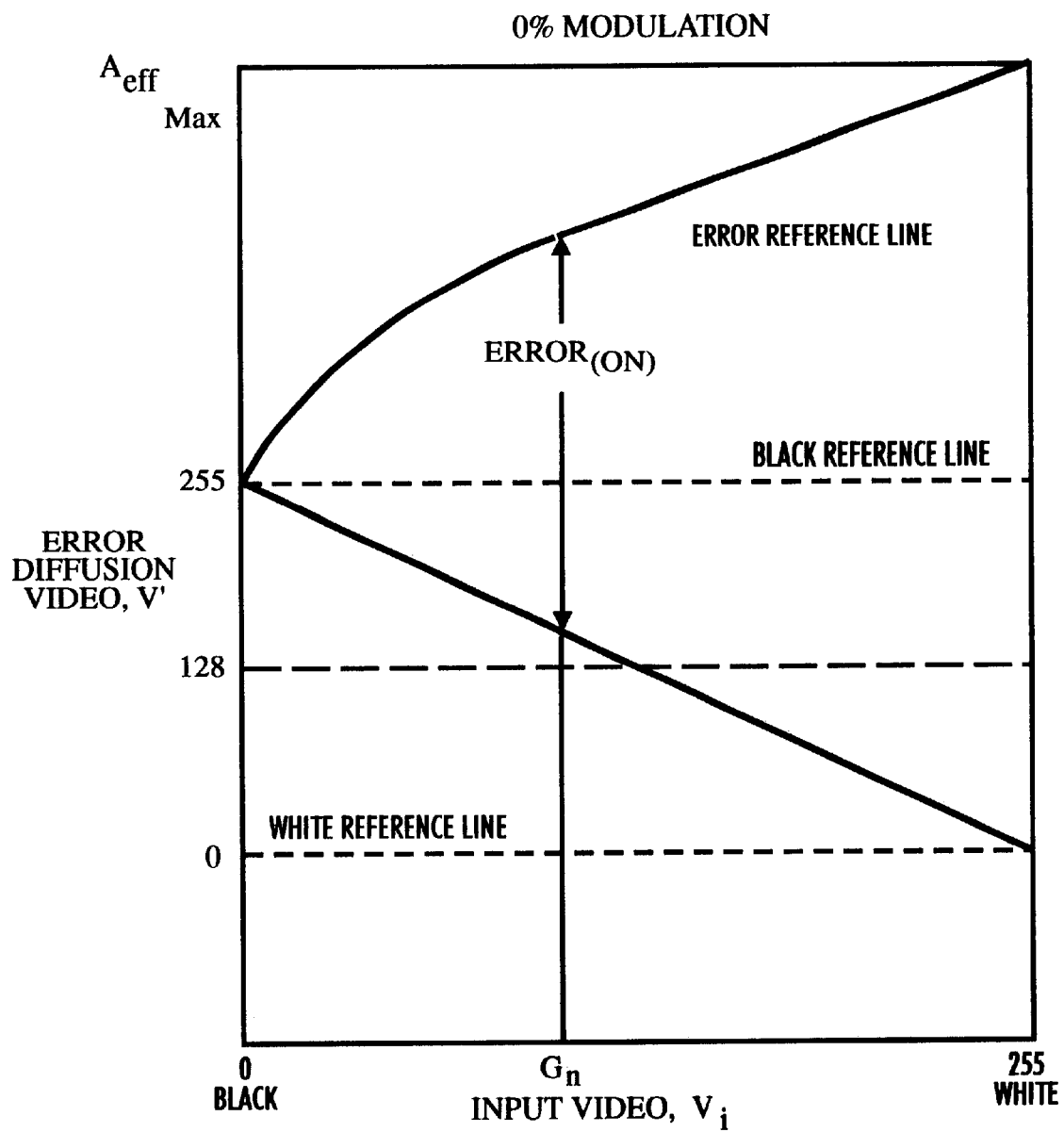
FIG. 6 shows a graphical superimposition of a linearized TRC superimposed on a video transformation in a standard error diffusion process.
Figure 7:
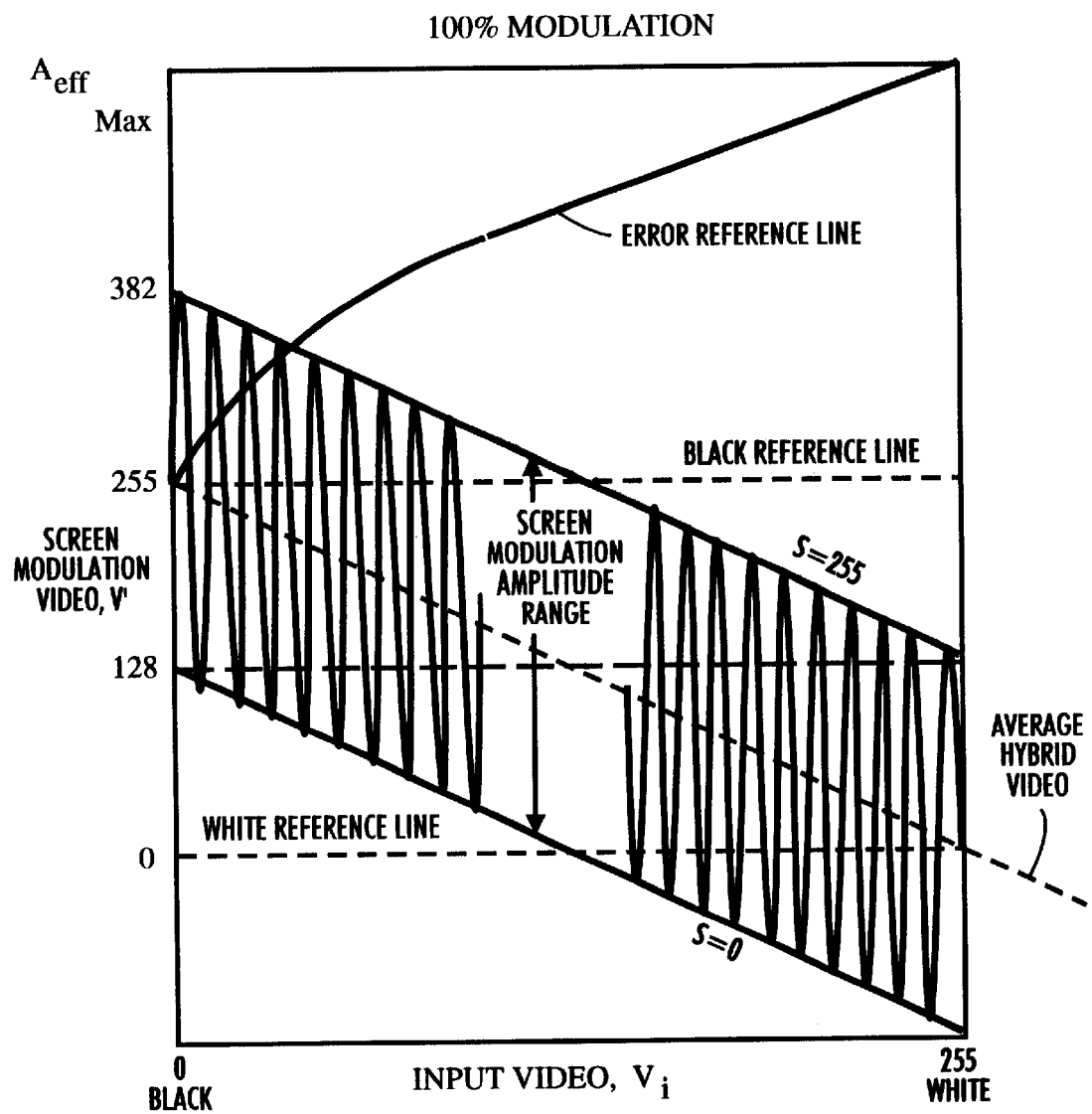
FIG. 7 shows a graphical superimposition of a linearized TRC on a hybrid video transformation.

The effective spot gain curve can be superimposed on a hybrid transformation curve to illustrate the magnitude of the error to be propagated downstream. It is noted that the magnitude of the error to be propagated downstream is a function of the input grey video value. The superimposing of the effective spot gain curve is illustrated in FIGS. 6 and 7 wherein FIG. 6 illustrates a situation for 0% modulation and FIG. 7 represents the situation for 100% modulation.

Conventionally, the black reference line is used to calculate the error to be propagated downstream. However, in the present invention, the error reference line is used to calculate the error to be propagated downstream wherein the error reference line is a function of the input grey level. Moreover, the utilization of the error reference line to calculate the error works for both 0% modulation and 100% modulation because the average hybrid video for any given input grey level is equal when utilizing a properly designed symmetric screen. Hence, the average error propagated to the downstream pixels is essentially the same between the two modulation extremes for any grey level input.

Figure 9:
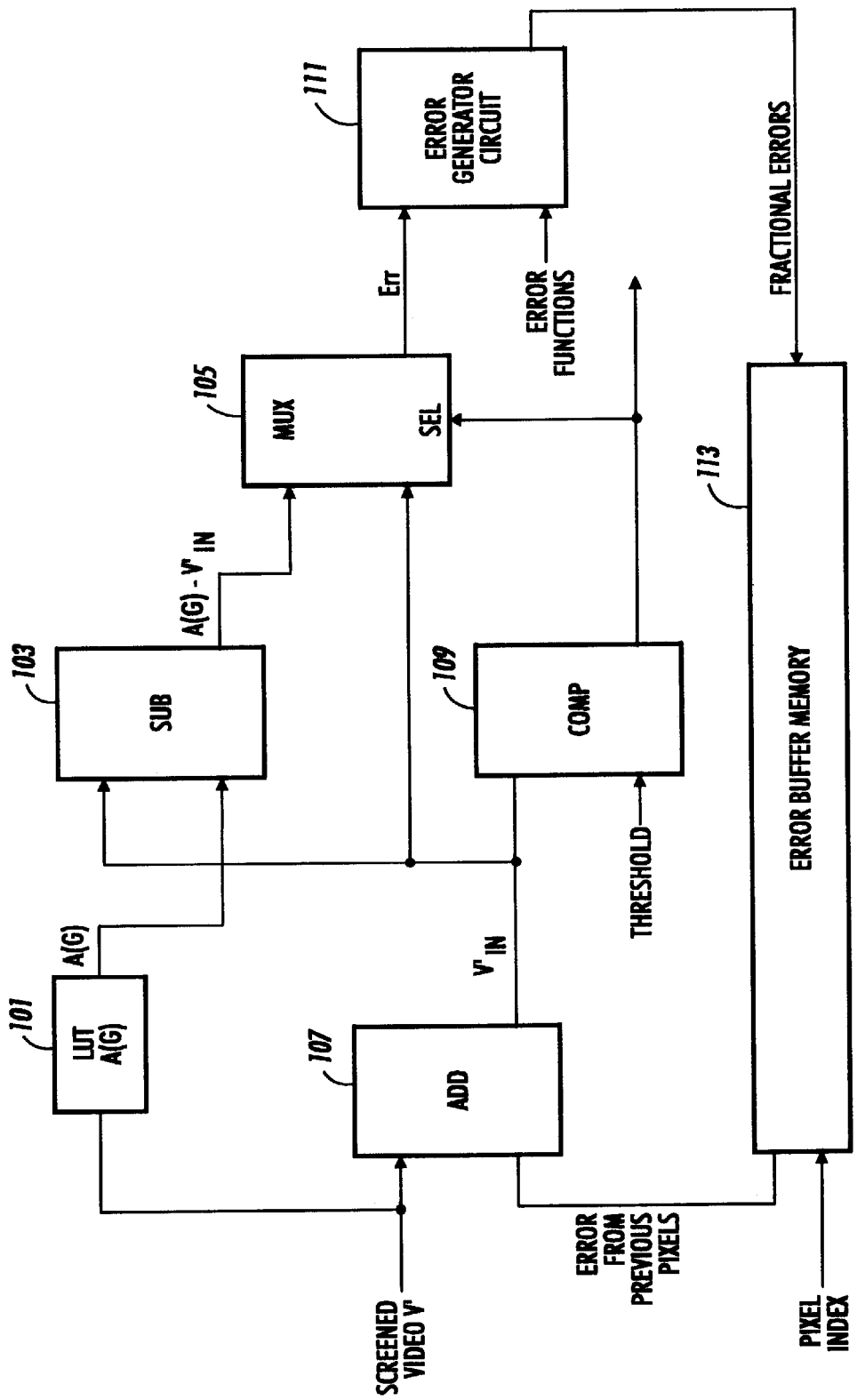
FIG. 9 shows a block diagram illustrating a circuit for implementing an error diffusion according to the concepts of the present invention.

FIG. 9 illustrates a block diagram of one embodiment of the present invention wherein the tonal reproduction curve (TRC) for a printer using a hybrid error diffusion process is linearized without the production of the previously mentioned artifacts (clumps and streaks of dark pixels in the midtone to shadow areas of the image). More specifically, rather than performing a deterministic computation of the spot coverage of each new black pixel as described in the U.S. Pat. No. 5,087,981, the present invention empirically deduces the effective area. This empirically deduced effective area is then utilized to compensate the error diffusion process so that the TRC is substantially linearized.

The process for empirically deducing the effective area will be explained in detail by utilizing FIG. 8. Initially, test patches are printed from ranging white to black with any standard or conventional error diffusion process. Thereafter, the reflectance of each test patch is measured. Since the input grey level $G_{in}$ for each printed test patch is known, one can plot the output grey level $G_{out}$ (the measured reflectance) of the test patches versus the known input grey level value $G_{in}$. In this regard, the plot generates a curve similar to that illustrated in FIG. 8. Since when utilizing a standard or conventional error diffusion process the measure output grey level $G_{out}$ will exceed that of the input grey level $G_{in}$, the statistical effective area of a printed black spot can be calculated by $A_{eff}=G_{out}/G_{in}$ and represented by A(G). Thus, the effective spot area A(G) can be tabulated as a function of $G_{out}$.

This new effective spot area A(G) is then utilized in determining the error to be propagated to downstream neighboring pixels in the hybrid error diffusion process. More specifically, when a binary printing device prints a black pixel and the hybrid error diffusion modified input grey level is $G'_{in}$, wherein $G'_{in}$ is equal to $(G_L-V_i)+(S_i-Th)+$err, the error to be propagated to the downstream neighboring pixels is $G'_{in}-A(G)$. On the other hand, when a binary printing device prints a white pixel and the hybrid error diffusion modified input grey level is $G'_{in}$, wherein $G'_{in}$ is equal to $(G_L-V_i)+(S_i-Th)+$err, the error to be propagated to the downstream neighboring pixels is $G'_{in}$.

As noted above, FIG. 9 illustrates a circuit which implements such a compensated hybrid error diffusion process. In FIG. 9, an input grey value $G_{in}$, wherein $G_{in}$ is equal to $(G_L-V_i)+(S_i-Th)$, is received by an adder 107. The adder 107 also receives the accumulated error (err) generated from neighboring pixels which has been propagated to the pixel location associated with the input grey value $G_{in}$. These two values are added by the adder 107 to produce a error diffusion modified input grey value $G'_{in}$, wherein $G'_{in}$ is equal to $(G_L-V_i)+(S_i-Th)+$err.

The modified grey value $G'_{in}$ is received by a comparator 109, a multiplexer 105, and a subtraction circuit 103. In the preferred embodiment, the grey level or video range of the image data is 0 to 255. In the comparator 109, the modified grey value $G'_{in}$ is compared with a threshold value to determine whether a pixel is to be printed or not. In the preferred embodiment of the present invention, the threshold value is 128; however, any threshold value or threshold process can be utilized.

The output from the comparator 109 represents whether a printer will print a pixel or not and is fed into the multiplexer 105 as well as to the printing device for proper rendering. The input grey value $G_{in}$ is also received by a look-up table 101 which stores the empirically deduced effective spot area A(G) values for that particular printing device. The values are pre-tabulated through the printing of test patches and the measuring of the reflectance of these test patches. Based on the input grey value $G_{in}$, the look-up table 101 outputs the associated effective spot value A(G). This effective spot area value A(G) is fed to the subtraction circuit 103 wherein the subtraction circuit 103 subtracts the effective spot area value A(G) from the modified grey value $G'_{in}$. The result of the subtraction circuit 103 is fed to the multiplexer 105.

The multiplexer 105 selects either the value $G'_{in}$ or the value $G'_{in}$–A(G) based on the output received from comparator 109. More specifically, if the output will cause a black pixel is to be printed; i.e., $G'_{in}$ is greater than the threshold value; the multiplexer selects the input value of $G'_{in}$–A(G). On the other hand, if the comparator 109 determines that a white pixel is to be generated; i.e., the value $G'_{in}$ is less than the threshold value; the multiplexer selects the value $G'_{in}$ to output.

The output value from the multiplexer 105 reflects the error value, Err, to be propagated to downstream pixels. This error value, Err, is fed into an error generation circuit 111 which produces the actual error values to be propagated to the individual downstream pixels. This error generation circuit 111 may be a multiplier which multiplies the error value, Err, from the multiplexer 105 by various error fraction values or error coefficients. On the other hand, the error generation circuit 111 may be a look-up table which has prestored therein the individual error values to be propagated to the downstream pixels wherein the error values are retrieved from the look-up table based on the error value input value and inputted coefficient values used for the particular error diffusion process.

The individual fractional error values are temporarily stored in an error buffer 113 for proper recall when the pixel associated with the buffered error value is to be processed in the error diffusion process.

Figure 29:
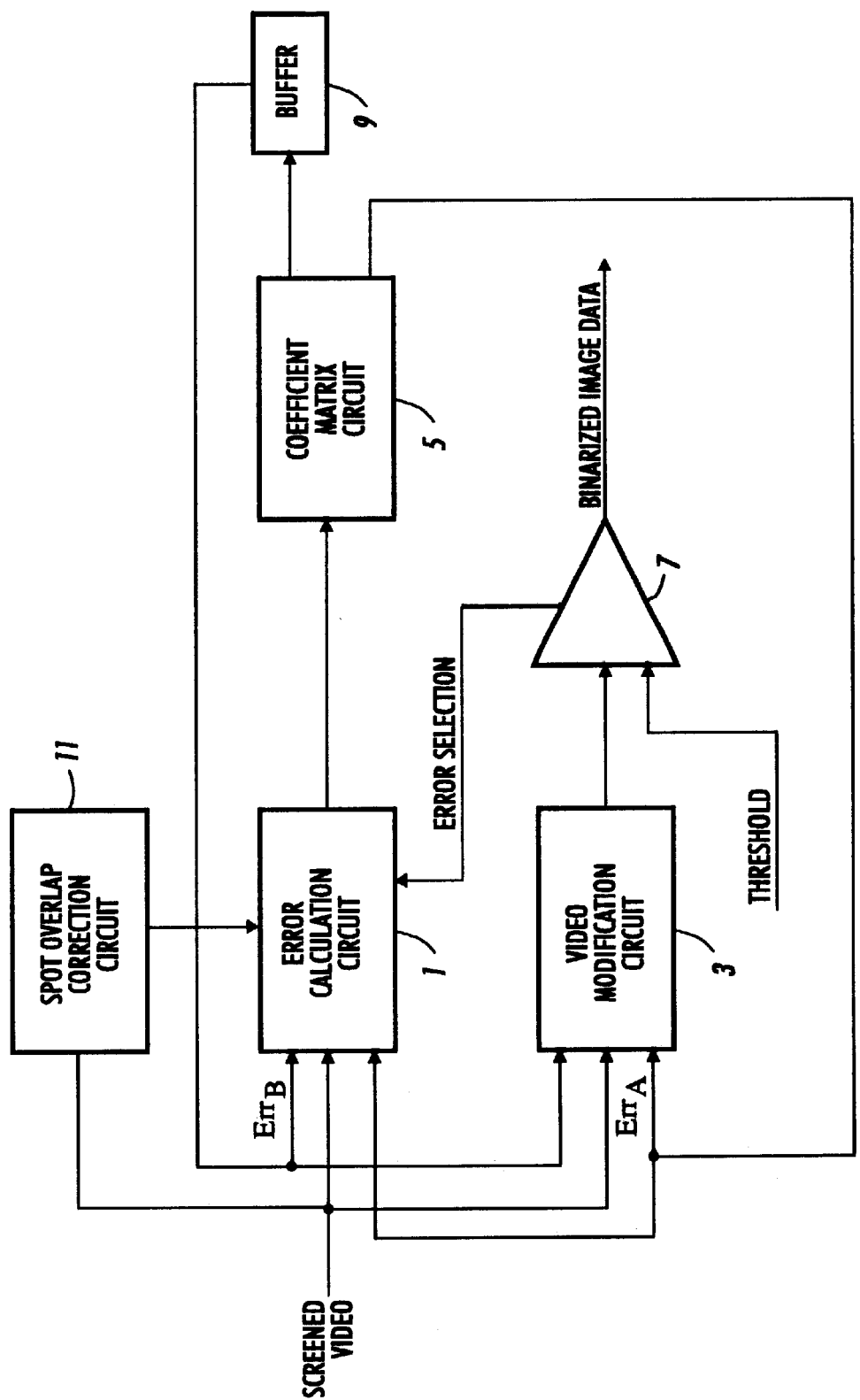
FIG. 29 is a block diagram illustrating implementation of the processes illustrated in FIGS. 20–28 according to the present invention.

FIG. 29 illustrates a functional block diagram of the parallel pipeline high addressability error diffusion circuit having tonal reproduction curve adjustment according to a preferred embodiment of the present invention. In FIG. 29, the input screened video signal is fed into an error calculation circuit 1, a spot overlap correction circuit 11, and a video modification circuit 3. The error components $e_{FIFO}$ ($Err_B$) and $e_{FB}$ ($Err_A$) are also fed into the error calculation circuit 1.

The input screened video signal is received by the spot overlap correction circuit 11 which includes a look-up table that stores the empirically deduced effective spot area A(G) values for that particular printing device. In this high addressability environment, A(G) is equal to $A_{eff}*(255/N)$ wherein $A_{eff}$ is the empirically deduced values and N is the addressability of the printing system. The values are pre-tabulated through the printing of test patches and the measuring of the reflectance of these test patches. Based on the input value, the look-up table outputs the associated effective spot value A(G). This effective spot area value A(G) is fed to the subtraction circuit 103 wherein the error calculation circuit.

The error calculation circuit 1 calculates all the various possible error values that can result from the presently occurring binarization process. The selection of the proper error to be output by the error calculation circuit 1 is based upon the received error selection signal which will be discussed in more detail below.

The selected error value from the error calculation circuit 1 is fed into a coefficient matrix circuit 5 which distributes the error based upon a set of weighting coefficients. The coefficient matrix circuit 5 splits the error values into the two components $e_{FIFO}$ ($Err_B$) and $e_{FB}$ ($Err_A$). As noted before, the feedback error, $Err_A$, is fed back to the video modification circuit 3 and the error calculation circuit 1 from the coefficient matrix circuit 5. The video modification circuit 3 also receives the $Err_B$ from buffer 9.

The video modification circuit 3 produces the interpolated subpixel values for the high addressability error diffusion method wherein the interpolated subpixel values are fed into the binarization circuit 7 along with a threshold value. In the preferred embodiment of the present invention, the threshold value is 128. However, it is noted that this threshold value can be any value.

The binarization circuit 7 binarizes the inputted video data so as to output binarized image data for the utilization by an image rendering device. The binarization circuit 7 also produces the error selection signal which is utilized by the error calculation circuit 1 to choose the correct error value to be fed to the coefficient matrix circuit 5. This error selection signal represents the number of interpolated subpixels which are turned ON during the binarization process. Thus, the error calculation circuit 1 may include a multiplexer to make this selection.

As illustrated in FIG. 29, the error calculation circuit 1 is in parallel with the video modification circuit and the binarization circuit. Moreover, the high addressability error diffusion architecture of the present invention is implemented on an ASIC, thereby enabling hardware implementation so that the image data can be binarized within the time constraints and throughput specifications of a high speed image rendering device.

Figure 30:
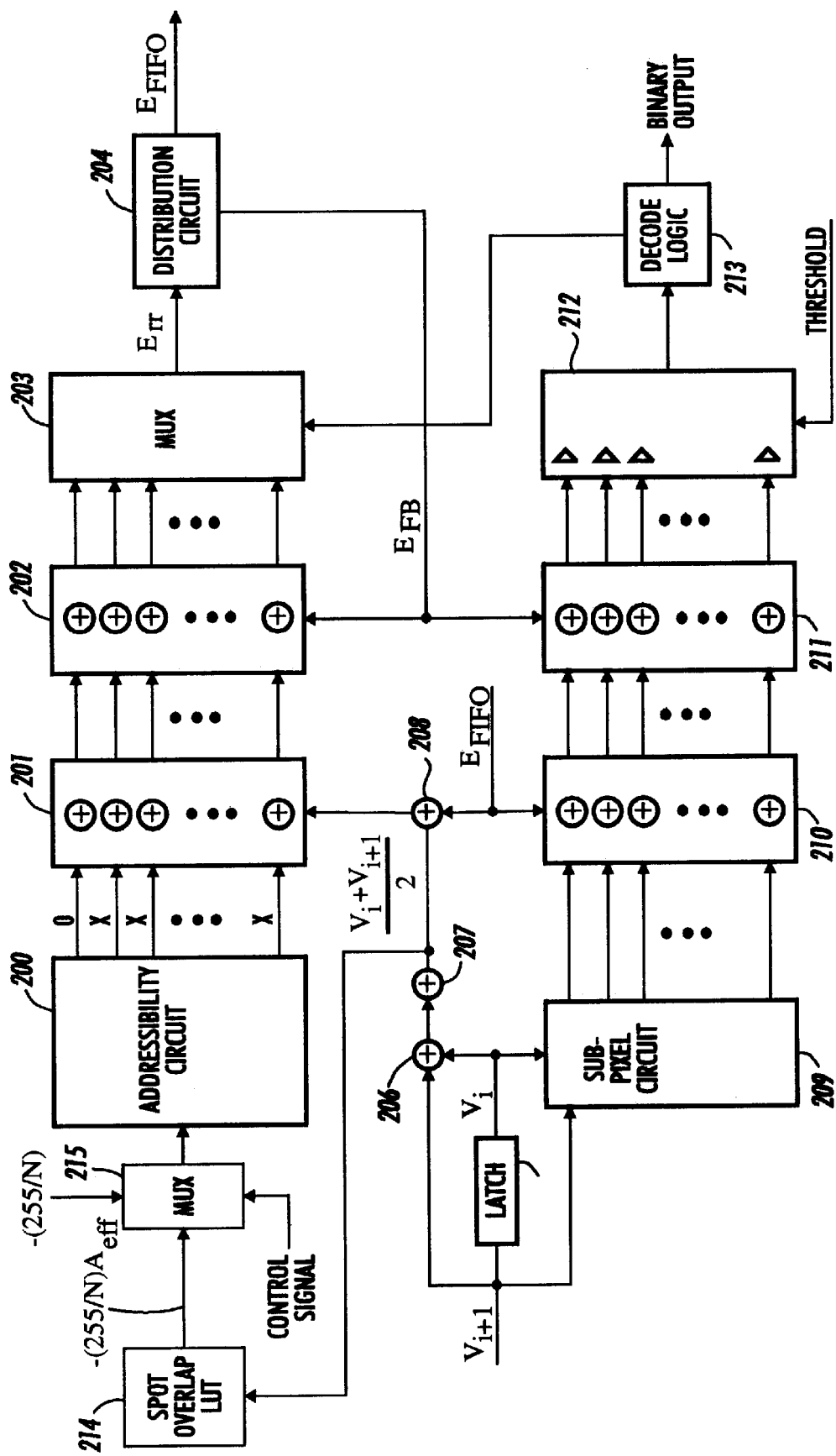
FIG. 30 is a block diagram illustrating circuitry implementation of the processes illustrated in FIGS. 20–28 according to the present invention.
Figure 31:
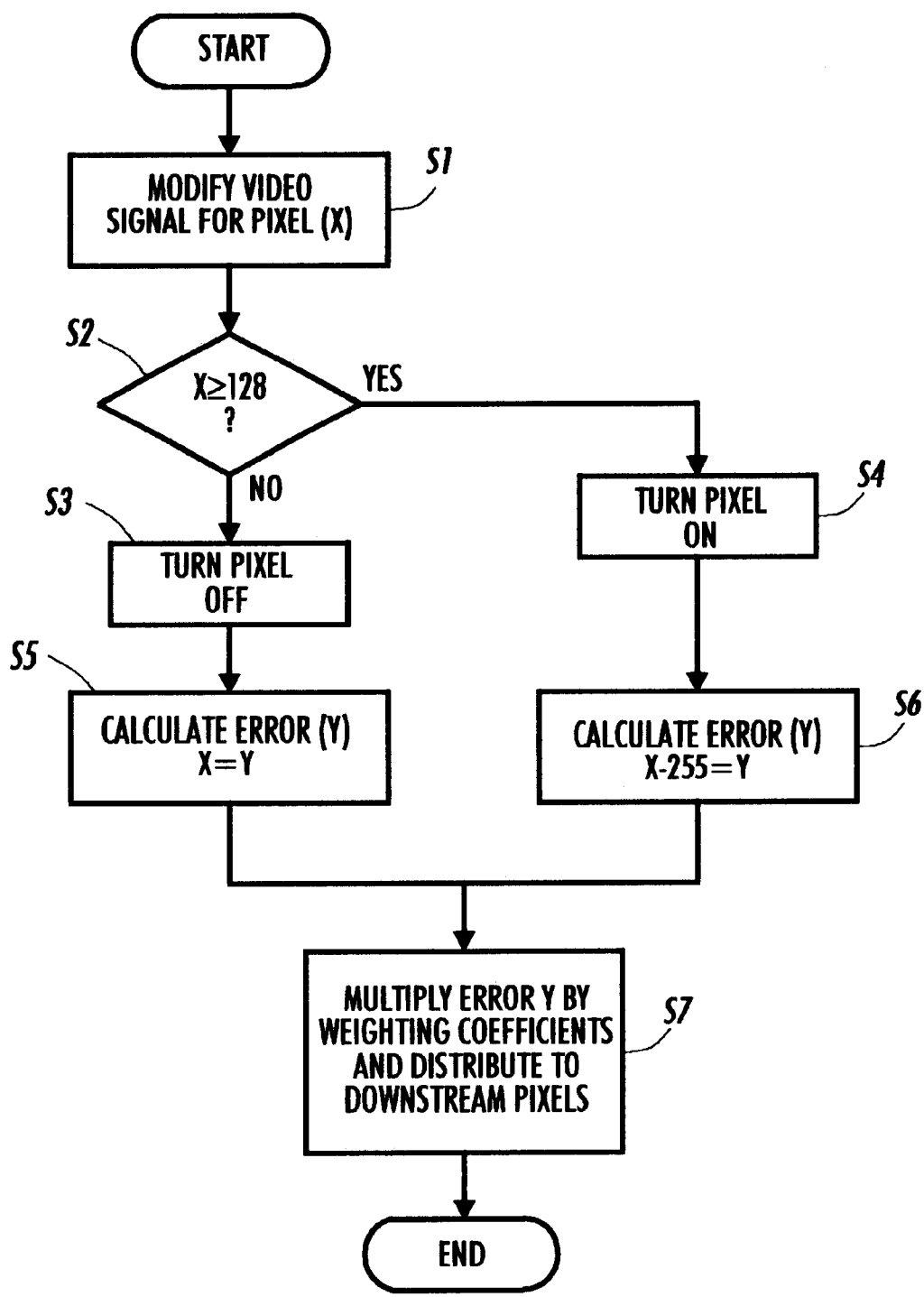
FIG. 31 shows a flowchart illustrating a typical error diffusion method.
Figure 32:
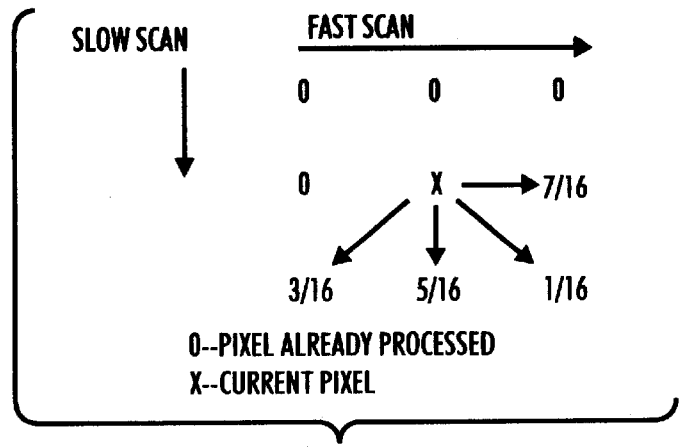
FIG. 32 shows a diagram illustrating a typical weighting coefficient scheme.

FIG. 30 illustrates a detail block diagram of the circuit of the preferred embodiment of the present invention. As illustrated in FIG. 30, many of the computations, as previously described with respect to FIGS. 20–28, are carried out in parallel.

Screened pixel values $V_i$ and $V_{i+1}$ are obtained by the utilization of a latch 205 which latches the screened video signal so that two adjacent fastscan pixels are available for processing. The screened pixel values $V_i$ and $V_{i+1}$ are summed in adder 206 and the sum is divided in half by divider 207. The result from divider 207 is fed into adder 208 with the error term $e_{FIFO}$ and spot overlap lookup table (LUT) 214. The sum from adder 208 represents the desired output to the printer.

From the received video value, the spot overlap LUT 214 outputs a correction value equal to $-A_{eff}*(255/N)$ wherein $A_{eff}$ is the empirically deduced values and N is the addressability of the printing system. The values are pre-tabulated through the printing of test patches and the measuring of the reflectance of these test patches. Based on the input value, the look-up table outputs the associated effective spot value A(G). This value is fed into a multiplexer 215 along with a control signal and the value $-(255/N)$. If the printing system is program to compensate for spot overlap, the control signal will cause the multiplexer to output the value $-A_{eff}*(255/N)$, otherwise the multiplexer 215 will output the value $-(255/N)$.

In parallel to the above described process, an actual output generation circuit 200 produces all possible outputs to the printer based on the high addressability characteristic. It is noted that these values are negative since an adder is used for subtraction operations. Moreover, the value for X is the value selected by the multiplexer 215. If the high addressability characteristic is N, N possible actual outputs will be generated. Also in parallel to the above described process, a subpixel circuit generated all the interpolated subpixels based on the screened pixel values $V_i$ and $V_{i+1}$.

Next, the error component $e_{FIFO}$ is added to each of the interpolated subpixels by adder 210. At the same time (in parallel thereto), each possible actual outputs (negative values) is individually added to the desired output by adder 201. In other words, N possible actual subpixel outputs are subtracted from the desired output to produce N possible error outputs.

In adders 211 and 202, a feedback error term $e_{FB}$ is added to each summation from adders 210 and 201, respectively. These computations are carried out in parallel. After completing these parallel computations, each interpolated subpixel from adder 211 is compared to a threshold value in threshold circuit 212. The subpixels having a value greater than or equal to the threshold value are turned ON. Threshold circuit outputs a number representing the number of sub pixels turned ON. This information is fed into a decode logic circuit which produces a binary therefrom to be sent to a printer.

Moreover, the error terms from adder 202 are fed into a multiplexer 203 which chooses which error term to propagate to down stream pixels. The error term is selected based on a control signal received from the decode logic circuit 213. The selected error term is fed into a distribution circuit 204 which produces the next feedback error and the error to be stored in a buffer for utilization in the processing of the next scanline.

Figure 39:
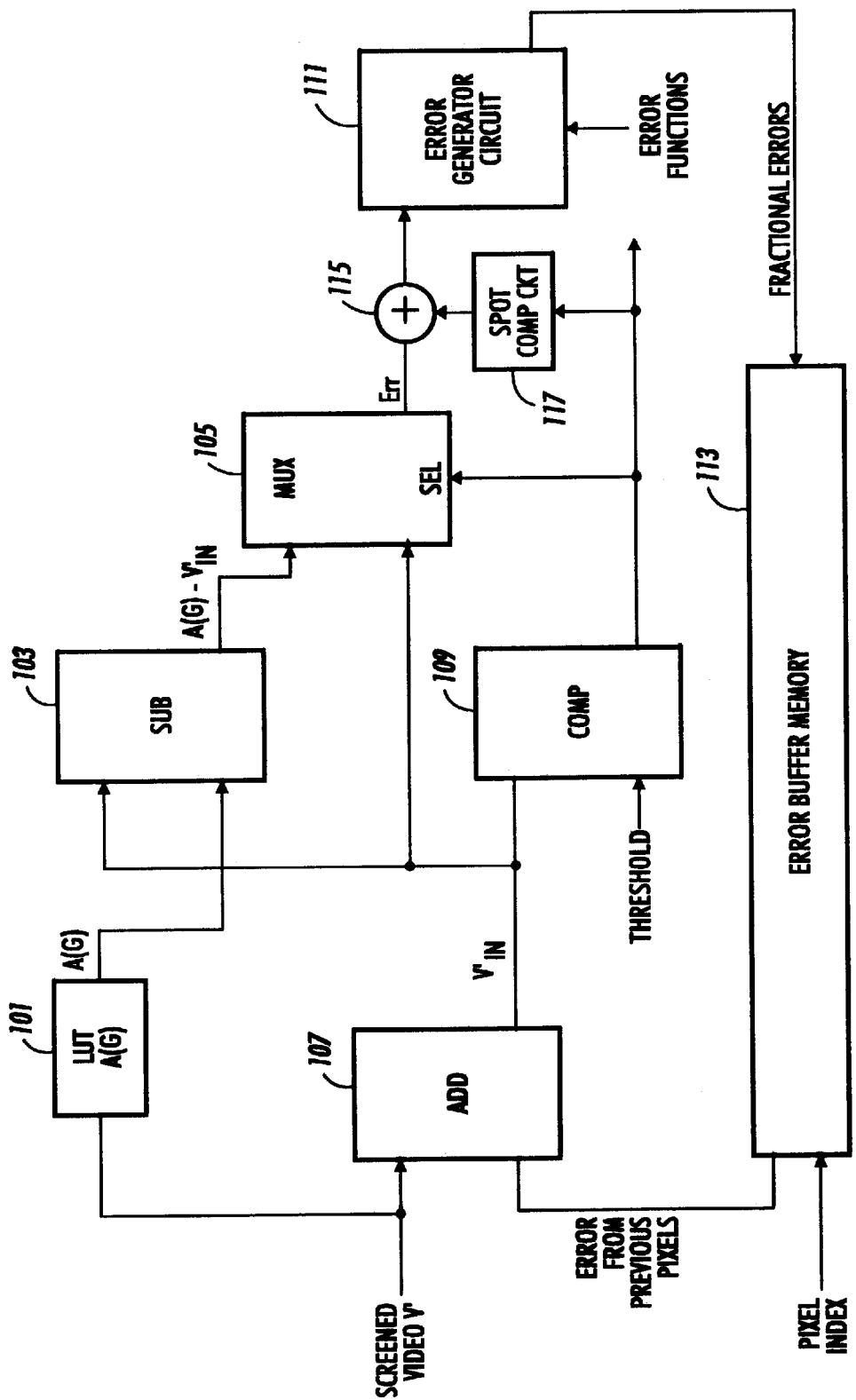
FIG. 39 shows a block diagram of another embodiment of the present invention.

Lastly, FIG. 39 illustrates another embodiment of the present invention. In FIG. 39, an input grey value $G_{in}$, wherein $G_{in}$ is equal to $(G_L-V_i)+(S_i-Th)$, is received by an adder 107. The adder 107 also receives the accumulated error (err) generated from neighboring pixels which has been propagated to the pixel location associated with the input grey value $G_{in}$. These two values are added by the adder 107 to produce a error diffusion modified input grey value $G'_{in}$, wherein $G'_{in}$ is equal to $(G_L-V_i)+(S_i-Th)+\text{err}$.

The modified grey value $G'_{in}$ is received by a comparator 109, a multiplexer 105, and a subtraction circuit 103. In the preferred embodiment, the grey level or video range of the image data is 0 to 255. In the comparator 109, the modified grey value $G'_{in}$ is compared with a threshold value to determine whether a pixel is to be printed or not. In the preferred embodiment of the present invention, the threshold value is 128; however, any threshold value or threshold process can be utilized.

The output from the comparator 109 represents whether a printer will print a pixel or not and is fed into the multiplexer 105 as well as to the printing device for proper rendering. The input grey value $G_{in}$ is also received by a look-up table 101 which stores the empirically deduced effective spot area A(G) values for that particular printing device. The values are pre-tabulated through the printing of test patches and the measuring of the reflectance of these test patches. Based on the input grey value $G_{in}$, the look-up table 101 outputs the associated effective spot value A(G). This effective spot area value A(G) is fed to the subtraction circuit 103 wherein the subtraction circuit 103 subtracts the effective spot area value A(G) from the modified grey value $G'_{in}$. The result of the subtraction circuit 103 is fed to the multiplexer 105.

The multiplexer 105 selects either the value $G'_{in}$ or the value $G'_{in}-A(G)$ based on the output received from comparator 109. More specifically, if the output will cause a black pixel is to be printed; i.e., $G'_{in}$ is greater than the threshold value; the multiplexer selects the input value of $G'_{in}-A(G)$. On the other hand, if the comparator 109 determines that a white pixel is to be generated; i.e., the value $G'_{in}$ is less than the threshold value; the multiplexer selects the value $G'_{in}$ to output.

The output value from the multiplexer 105 reflects the error value, Err, to be propagated to downstream pixels. This error value, Err, is fed into an adder 115 which adds the error associated with subpixel creation artifacts. More specifically, adder 115 receives a signal multiplexer 117 which selects the subpixel creation correction term based on a comparison between the previously processed output video signal and the presently processed output video signal. The error correction value is either zero or $\Delta p*(W_v-B_v)$. The sum from adder 115 is fed to error generation circuit 111 which produces the actual error values to be propagated to the individual downstream pixels.

The compensation for subpixel creation will be explained in more detail below. FIG. 39 compensates for the printer property of pixel growth: the phenomena where black (white) pixels tend to grow into white (black) areas. The correction is made by detecting black/white pixel borders and then updating the error propagated in the error diffusion process to account for the pixel growth.

As noted above, this conventional error diffusion process assumes that the printer is an ideal device wherein the black pixels and white pixels never change in size. However, in reality, the size of the pixels are not fixed. In white black xerographic printers, black pixels tend to grow. If a single black pixel is output on a piece of paper, it's area will be larger than $1/N^2$, where the printer resolution is N pixels per inch. If the pixel is placed down in an area where both of the pixels are black, the resulting area coverage will not grow, since the area it can grow into is already black.

The amount of coverage of a pixel is therefore dependent on the type of pixels surrounding it. For images using error diffusion, this results in output images who's apparent grey level is not a function of just the mean grey level input, but also of the grey level distribution and printer properties.

In order to demonstrate the concept of pixel growth, an example of one dimensional growth will be discussed. For this example, black pixels are considered the ones that grow (alternatively), white pixels can be considered to shrink, (thereby making the results identical). For this example, it is assumed that a horizontal black line is printed by setting one hundred adjacent pixels to black. Each of the pixels in the center of the line cannot grow since they are surrounded by black pixels. The pixels at the end of the line, however, can grow. The black pixel on the left side of the line can grow into the white area on its left. In addition, the black pixel on the right side of the line can grow into the white are on its right. If each end pixel encroaches one-half pixel into their adjoining white areas, the total length of the line would be 100+½+½ or 101 pixels.

In general, if a black pixel is adjacent to a white pixel, it can be assumed that he black pixel will grow Δp pixels into the white pixel. The amount of growth is assumed to be independent of direction. If the black and white pixels are juxtaposed, the amount of growth will not change.

If a black pixel is placed to the right of a white pixel, it is known that the pixel will encroach into the white area on its left. Similarly, if a white pixel is placed to the right of a black pixel, it is known that the black pixel will grow into the white area on its right. Therefore, if a black pixel is placed down next to a white pixel, its length will be the equivalent of (1+Δp) "Ideal" black pixels. In addition, the length of the white pixel next to it will decrease by Δp.

Similarly, if a white pixel is placed next to a black pixel, the black length will increase by Δp since the black pixel next to the white pixel will encroach into the white area. Moreover, the white length will decrease by 1−Δp. It is noted that in each occurrence of a white/black edge, the aggregate length of black increase by Δp and the aggregate white length decreases by Δp, as compared to when no edge is present.

Utilizing the above example, the aggregate length of black and white pixels on a line can be found by using the following formulation. More specifically, if the pixel is black, the length of the black pixels equals the length of the black pixels plus one. On the other hand, if the pixel is white, the length of the white pixels equals the length of the white pixels plus 1. However, if the present pixel is not equal to the previous pixels, the length of the black pixels is equal to the length of the black pixels plus Δp and the length of the white pixels equals the length of the white pixels minus Δp.

Given this model for growth, it is possible to correct for the growth in the error diffusion process by changing the error distributed to future pixels. If no black/white edge is present, the error passed down should not be changed since there is no growth. However, if a black/white edge is present, the error should be updated to reflect the fact that the pixel is Δp more black and Δp less white than the ideal case. Thus, the error diffusion process will be modified to reflect the following.

If the video output value of the present pixel is not equal to the video output value of the previous pixel, the error value generated above is modified such that the error value is equal to the previous error value plus Δp*(white value−black value).

The error generation circuit 111 may be a multiplier which multiplies the error value, Err, from the adder 115 by various error fraction values or error coefficients. On the other hand, the error generation circuit 111 may be a look-up table which has prestored therein the individual error values to be propagated to the downstream pixels wherein the error values are retrieved from the look-up table based on the error value input value and inputted coefficient values used for the particular error diffusion process.

The individual fractional error values are temporarily stored in an error buffer 113 for proper recall when the pixel associated with the buffered error value is to be processed in the error diffusion process.

One application of the present invention is in a binary printer. In this situation, the high addressability hybrid error diffusion process converts a multi-level input grey image signal to a binary signal which is used to record the input image on a recording medium. The recording medium may be any vehicle upon which an image or latent image of the original input image can be formed.

Another application of the present invention is in a digital copier. In this situation, the high addressability hybrid error diffusion process converts a multi-level input grey image signal generated by a digital scanner scanning a document or any other vehicle having an image formed thereon to a binary signal which is used to record the input image on a recording medium. Again, the recording medium may be any vehicle upon which an image or latent image of the original input image can be formed.

In describing the present invention, the terms pixel and subpixel have been utilized. These terms may refer to an electrical (or optical, if fiber optics are used) signal which represent the physically measurable optical properties at a physically definable area on a receiving medium. The receiving medium can be any tangible document, photoreceptor, or marking material transfer medium. Moreover, the terms pixel and subpixel may refer to an electrical (or optical, if fiber optics are used) signal which represent the physically measurable optical properties at a physically definable area on a display medium. A plurality of the physically definable areas for both situations represent the physically measurable optical properties of the entire physical image to be rendered by either a material marking device, electrical or magnetic marking device, or optical display device.

Lastly, the term pixel may refer to an electrical (or optical, if fiber optics are used) signal which represents physical optical property data generated from a single photosensor cell when scanning a physical image so as to convert the physical optical properties of the physical image to an electronic or electrical representation. In other words, in this situation, a pixel is an electrical (or optical) representation of the physical optical properties of a physical image measured at a physically definable area on an optical sensor.

The present invention has been described in detail above; however, various modifications can be implemented without departing from the spirit of the present invention. For example, the preferred embodiment of the present invention has been described with respect to a printing system; however, this high addressability hybrid error diffusion compensation method is readily implemented in a display system. Moreover, the high addressability hybrid error diffusion compensation method of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level image output terminal or higher.

Lastly, the present invention has been described with respect to a monochrome or black/white environment. However, the concepts of the present invention are readily applicable to a color environment. Namely, the error diffusion compensation process of the present invention can be applied to each color space value representing the color pixel.

In recapitulation, the present invention provides a high addressability hybrid error diffusion method or module which enables an image processing system to convert an electronic document of one format to that of another format utilizing a spot overlap compensation value that eliminates clumps and streaks of dark pixels in the midtone to shadow areas of the image while enabling the rendering of a reproduced grey wedge that demonstrates a gradual increase in density when compared to an original grey wedge.

While the present invention has been described with reference to various embodiments disclosed herein before, it is not to be combined to the detail set forth above, but is intended to cover such modifications or changes as made within the scope of the attached claims.

What is claimed is:

1. A method of reducing a number of grey levels of a multi-level grey scale pixel value representing a pixel and diffusing an error generated from reducing the number of grey levels, comprising the steps of:

(a) receiving a multi-level grey scale pixel value, the multi-level grey scale pixel value having a first spatial resolution;

(b) generating a screened multi-level grey scale pixel value from the received multi-level grey scale pixel value;

(c) reducing the number of grey levels in the screened multi-level grey scale pixel value;

(d) generating an error value as a result of the reduction process in said step (c);

(e) modifying the generated error value based on an effective spot area value to generate a modified error value, the effective spot area value being dependent on the multi-level grey scale pixel value; and (f) diffusing, based on a set of pre-determined weighting coefficients, the modified error value to multi-level grey scale pixel values of adjacent pixels.

2. The method as claimed in claim 1, further comprising the step of:

(g) converting the screened multi-level grey scale pixel value to a set of subpixels having a second spatial resolution prior to the execution of said step (c), the second spatial resolution being higher than the first spatial resolution;

said step (c) reducing the number of grey levels of each subpixel of the set;

said step (d) generating an error value having a spatial resolution corresponding to the first spatial resolution.

3. The method as claimed in claim 2, wherein said step (g) comprises the substeps of:

(g1) computing a first multi-level grey scale pixel value; and (g2) computing a second multi-level grey scale pixel value.

4. The method as claimed in claim 3, wherein said step (g) further comprises the substep of:

(g3) computing a plurality of multi-level grey scale subpixel values $B_n$, the multi-level grey scale subpixel values $B_n$ being equal to $P0+n(P1-P0)/N$, wherein n is equal to 0 to N−1, P0 is equal to the first multi-level grey scale pixel value, P1 is equal to the second multi-level grey scale pixel value, and N is equal to a high addressability characteristic.

5. The method as claimed in claim 4, wherein said step (b) uses a dot screen to generate the screened multi-level grey scale pixel value.

6. The method as claimed in claim 4, wherein said step (d) comprises the substeps of:

(d1) calculating a desired output, the desired output being equal to a sum of the first and second multi-level grey scale pixel values divided by two;

(d2) calculating an actual output, the actual output being equal to a lowest screen value of a line screen plus a number of subpixels being equal to or greater than a threshold value multiplied by a difference between a maximum screen value of the line screen and the lowest screen value of the line screen divided by a high addressability characteristic, and (d3) calculating the error value to be equal to the desired output minus the actual output, the calculated error value having a spatial resolution equal to the first spatial resolution.

7. The method as claimed in claim 1, wherein said step (e) generates the effective spot area value from a look-up table having a plurality of effective spot area values, each effective spot area value being mapped to a received multi-level grey scale value.

8. A system for reducing a number of grey levels in a multi-level grey scale pixel value representing a pixel and diffusing an error generated from reducing the number of grey levels, comprising:

input means for receiving the multi-level grey scale pixel value, the multi-level grey scale pixel value having a first spatial resolution;

screening means for generating a screened multi-level grey scale pixel value;

high addressability means for converting the screened multi-level grey scale pixel value to a set of subpixels having a second spatial resolution, the second spatial resolution being higher than the first spatial resolution;

reduction means for reducing the number of grey levels in each subpixel of the set;

spot area means for generating an effective spot area value based on the received multi-level grey scale pixel value;

error means for generating a plurality of possible error values;

means for multiplying each possible error value by the effective spot area value to produce a plurality of possible modified error values;

selecting means for selecting an error value from the plurality of possible modified error values as a result of the reduction by said reduction means; and error diffusing means for diffusing the selected modified error value to multi-level grey scale pixel values of adjacent pixels.

9. The system as claimed in claim 8, wherein said high addressability means computes a first and second multi-level grey scale pixel value.

10. The system as claimed in claim 9, wherein said high addressability means further computes a plurality of multi-level grey scale subpixel values $B_n$, the multi-level grey scale subpixel values $B_n$ being equal to $P0+n(P1-P0)/N$, wherein n is equal to 0 to N−1, P0 is equal to the first multi-level grey scale pixel value, P1 is equal to the second multi-level grey scale pixel value, and N is equal to a high addressability characteristic.

11. The system as claimed in claim 10, wherein said screening means uses a dot screen to generate the screened multi-level grey scale pixel value.

12. The system as claimed in claim 8, wherein said spot area value generating means includes a look-up table having a plurality of effective spot area values, each effective spot area value being mapped to an input grey image value.

13. The system as claimed in claim 8, further comprising a printer operatively connected to said reduction means.

14. The system as claimed in claim 13, wherein the effective spot area value is equal to an output grey image value divided by the input grey image value, the output grey image value being a value corresponding to the input grey image value from a tonal reproduction curve representing printing characteristics of said printer.

15. A method of generating an error value, comprising the steps of:
   (a) receiving a multi-level grey scale pixel value, the multi-level grey scale pixel value having a first spatial resolution;
   (b) generating a screened multi-level grey scale pixel value from the received multi-level grey scale pixel value;
   (c) converting the screened multi-level grey scale pixel value to a set of subpixels having a second spatial resolution, the second spatial resolution being higher than the first spatial resolution;
   (d) thresholding each subpixel of the set;
   (e) generating an error value as a result of thresholding the subpixels in the set in said step (d), the error value having a spatial resolution equal to the first spatial resolution;
   (f) generating an effective spot area value dependent on the received multi-level grey scale pixel value; and
   (g) modifying the generated error value based on the generated effective spot area value.

16. The method as claimed in claim 15, further comprising the step of:
   (h) diffusing the error value to multi-level grey scale pixel values of pixels adjacent to the pixel being thresholded.

17. The method as claimed in claim 16, wherein said step (f) generates the effective spot area value from a LUT having a plurality of effective spot area values, each effective spot area value being mapped to a received multi-level grey scale value.

18. A printing system for rendering marks on a recording medium, comprising:
   receiving means for receiving a multi-level grey scale pixel value representing a pixel having a first spatial resolution;
   screening means for generating a screened multi-level grey scale pixel value;
   interpolation means for converting the screened multi-level grey scale pixel value to a set of subpixels having a second spatial resolution, the second spatial resolution being higher than the first spatial resolution;
   binarization means for binarizing each subpixel of the set so as to output a binary signal and an error value, the error value having a resolution equal to the first spatial resolution and the binary signal having a resolution equal to the second spatial resolution;
   spot area means for generating an effective spot area value based on the received multi-level grey scale pixel value;
   modifying means for modifying the error value based on the generated effective spot area value;
   diffusing means for diffusing, based on a set of predetermined weighting coefficients, the modified error value to multi-level grey scale pixel values corresponding to pixels adjacent to the pixel having the first spatial resolution; and
   rendering means for converting the binary signal into a mark on the recording medium.

19. The system as claimed in claim 18, wherein said spot area value generating means includes a look-up table having a plurality of effective spot area values, each effective spot area value being mapped to an input grey image value.

20. The system as claimed in claim 19, wherein the effective spot area value is equal to an output grey image value divided by the input grey image value, the output grey image value being a value corresponding to the input grey image value from a tonal reproduction curve representing printing characteristics of said printer.

21. The system as claimed in claim 18, wherein said binarization means comprises:
   first means for calculating a desired output, the desired outputs being equal to a sum of the first and second multi-level grey scale pixel values divided by two;
   second means for calculating an actual output, the actual output being equal to a lowest screen value of a line screen plus a number of subpixels being equal to or greater than a threshold value multiplied by a difference between a maximum screen value of the line screen and the lowest screen value of the line screen divided by a high addressability characteristic; and
   third means for calculating the error value to be equal to the desired output minus the actual output.

22. A system for generating an error, comprising:
   receiving means for receiving a multi-level grey scale pixel value representing a pixel having a first spatial resolution;
   screening means for generating a screened the multi-level grey scale pixel value;
   interpolation means for converting the screened multi-level grey scale pixel value to a set of subpixels having a second spatial resolution, the second spatial resolution being higher than the first spatial resolution;
   binarization means for binarizing each subpixel of the set so as to output a binary signal and an error value, the error value having a resolution equal to the first spatial resolution and the binary signal having a resolution equal to the second spatial resolution;
   spot area means for generating an effective spot area value based on the received multi-level grey scale pixel value; and
   modifying means for modifying the error value based on the generated effective spot area value.

23. The system as claimed in claim 22, further comprising:
   diffusing means for diffusing the error value to multi-level grey scale pixel values corresponding to pixels adjacent to the pixel having the first spatial resolution.

24. The system as claimed in claim 22, wherein the effective spot area value is equal to an output grey image value divided by the input grey image value, the output grey image value being a value corresponding to the input grey image value from a tonal reproduction curve representing printing characteristics.

25. A system for reducing a number of grey levels in a multi-level grey scale pixel value representing a pixel and diffusing an error generated from reducing the number of grey levels, comprising:
   input means for receiving the multi-level grey scale pixel value, the multi-level grey scale pixel value having a first spatial resolution;
   screening means for generating a screened multi-level grey scale pixel value;
   reduction means for reducing the number of grey levels in the screened multi-level grey scale pixel value;
   spot area means for generating an effective spot area value based on the received multi-level grey scale pixel value;

error means for generating an error value based on the reduction by said reduction means;

means for multiplying the error value by the effective spot area value to produce a a modified error value; and error diffusing means for diffusing the modified error value to multi-level grey scale pixel values of adjacent pixels.

26. The system as claimed in claim 25, wherein said spot area value generating means includes a look-up table having a plurality of effective spot area values, each effective spot area value being mapped to an input grey image value.

27. The system as claimed in claim 26, further comprising:

a printer operatively connected to said reduction means.

28. The system as claimed in claim 27, wherein the effective spot area value is equal to an output grey image value divided by the input grey image value, the output grey image value being a value corresponding to the input grey image value from a tonal reproduction curve representing printing characteristics of said printer.

* * * * *